United States Patent [19]
Matyjaszewski et al.

[11] Patent Number: 6,162,882
[45] Date of Patent: Dec. 19, 2000

[54] PREPARATION OF NOVEL HOMO- AND COPOLYMERS USING ATOM TRANSFER RADICAL POLYMERIZATION

[75] Inventors: Krzysztof Matyjaszewski; Simion Coca; Scott G. Gaynor; Yoshiki Nakagawa; Seong Mu Jo, all of Pittsburgh, Pa.

[73] Assignee: Carnegie Mellon University, Pittsburgh, Pa.

[21] Appl. No.: 09/431,871

[22] Filed: Nov. 2, 1999

Related U.S. Application Data

[60] Continuation of application No. 09/206,980, Dec. 8, 1998, which is a division of application No. 08/940,985, Sep. 30, 1997, Pat. No. 5,945,491, which is a division of application No. 08/677,828, Jul. 10, 1996, Pat. No. 5,789,487.

[51] Int. Cl.[7] .................................. C08F 4/44; C08F 4/00
[52] U.S. Cl. .......................... 526/111; 526/90; 526/135; 526/145; 526/146; 526/147; 525/168; 525/243; 525/245; 525/247; 525/255; 525/258; 525/259; 525/261; 525/269
[58] Field of Search .......................... 526/90, 111, 135, 526/145, 146, 147; 525/168, 243, 245, 247, 255, 258, 259, 261, 269

[56] References Cited

U.S. PATENT DOCUMENTS

| | | |
|---|---|---|
| 3,862,978 | 1/1975 | Decker et al. . |
| 4,145,486 | 3/1979 | Haag et al. . |
| 5,169,914 | 12/1992 | Kaszas et al. . |
| 5,405,913 | 4/1995 | Harwood et al. . |
| 5,451,647 | 9/1995 | Faust et al. . |
| 5,708,102 | 1/1998 | Fryd et al. . |
| 5,763,548 | 6/1998 | Maty Jaszewski et al. . |
| 5,767,210 | 6/1998 | Lecomte et al. . |
| 5,773,538 | 6/1998 | Feiring . |
| 5,789,487 | 8/1998 | Maty Jaszewski et al. . |
| 5,807,937 | 9/1998 | Maty Jaszewski et al. . |
| 5,811,500 | 9/1998 | Dubois et al. . |
| 5,854,364 | 12/1998 | Senninger et al. . |

FOREIGN PATENT DOCUMENTS

| | | |
|---|---|---|
| 1165828 | 11/1997 | China . |
| 0 265 091 A1 | 4/1988 | European Pat. Off. . |
| 0 789 036 A2 | 8/1997 | European Pat. Off. . |
| 0 816 385 A1 | 1/1998 | European Pat. Off. . |
| 0 824 110 A1 | 2/1998 | European Pat. Off. . |
| 0 824 111 A1 | 2/1998 | European Pat. Off. . |
| 0 826 698 A1 | 3/1998 | European Pat. Off. . |
| 0 832 902 A2 | 4/1998 | European Pat. Off. . |
| WO 97/47661 | 12/1997 | WIPO . |
| WO 98/06758 | 2/1998 | WIPO . |
| WO 98/20050 | 5/1998 | WIPO . |

OTHER PUBLICATIONS

Kato et al, "Polymerization of Methyl Methacrylate with the Carbon Tetrachloride/Dichlorotris (Triphenylphospine)Ruthenium(II)Methylaluminum . . .", Macromolecules 1995, 28, 1721–1723.

(List continued on next page.)

*Primary Examiner*—Samuel A. Acquah
*Attorney, Agent, or Firm*—Kirkpatrick & Lockhart LLP

[57] ABSTRACT

The present invention is directed to a process of atom (or group) transfer radical polymerization for the synthesis of novel homopolymer or a block or graft copolymer, optionally containing at least one polar group, with well defined molecular architecture and narrow polydipersity index, in the presence of an initiating system comprising (i) an initiator having a radically transferrable atom or group, (ii) a transition metal compound, and (iii) a ligand, the present invention is also directed to the synthesis of a macromolecule having at least two halogen groups which can be used as a macroinitiator component (i) to subsequently form a block or graft copolymer by an atom or group transfer radical polymerization process; the present invention is also directed to a process of atom or group transfer radical polymerization for the synthesis of a branched or hyperbranched polymer; in addition, the present invention is directed to a process of atom or group transfer radical polymerization for the synthesis of a macroinitiator which can subsequently be used to produce a block or graft copolymer.

24 Claims, 19 Drawing Sheets

OTHER PUBLICATIONS

T. E. Patten et al, "Polymers with very Low Polydispersities from Atom Transfer Radical Polymerization", *Science,* vol. 272, pp. 866–868, May 10, 1996.

V. Percec et al, "Self–Regulated Phase Transfer of $Cu_2o$/bpy, Cu(0)/bpy, and $Cu_2o$/cu(0)/bpy Catalyzed "Living" Radical Polymerization Initiated with Sulfonyl Chlorides", *Macromolecules,* vol. 31, No. 12, pp. 4053–4056, 1998.

A. Orochov et al, "Redox–Transfer, Part VI, Determination of Hammet's O–Constant for the Oxidation of Cuprous Chloride by Aromatic Sulphonyl Chlorides", *J. Chem. Soc. (B),* pp. 255–259.

M. Asscher et al, "Chlorine–Activation by Redox–Transfer, Part IV. The Addition of Sulphonyl Chlorides to Vinylic Monomers and Other Olefins", *Asscher and Vofsi,* pp. 4962–4971.

N. Kamigata et al, "Novel Perfluoroalkylation of Alkenes with Perfluoroalkanesulphonyl Chlorides Catalysed by a Ruthenium (II) Complex", *J. Chem. Soc. Perkin Trans,* pp. 627–633, 1991.

V. Percec et al, Living Radical Polymerization of Styrene Initiated by Arenesulfonyl Chlorides and $Cu^1(bpy)_nCl$, *Macromolecules,* vol. 28, No. 23, pp. 7970–7972, 1995.

V. Percec et al, "Metal–Catalyzed Living Radical Polymerization of Styrene Initiated with Arenesulfonyl Chlorides. From Heterogeneous to Homogeneous Catalysis", *Macromolecules,* vol. 29, No. 10, pp. 3665–3668, 1996.

Chemical Abstracts, vol. 85, 1976, pp. 20.

O. W. Webster, "Living Polymerization Methods", *Science,* vol. 25, Feb. 22, pp. 887–893, 1991.

S. Coca et al, "Polymerization of Acrylates by Atom Transfer Radical Polymerization. Homopolymerization of 2–Hydroxyethyl Acrylate", *Journal of Polymer Science: Part A: Polymer Chemistry.* vol. 36, pp. 1417–1424, 1998.

C. Granel et al "Controlled Radical Polymerization of Methacrylic Monomers in the Presence of Bis(ortho–chelated) Arylnickel(II) cCmplex and Different Activated Alkyl Halides", *Macromolecules,* vol. 29, No. 27, pp. 8576–8582, 1996.

K. Matyjaszewski et al, "Zerovalent Metals in Controlled/ "Living" Radical Polymerization", *Macromolecules.* vol 30, No. 23, pp. 7348–7350, 1997.

C. Marestin et al, "Nitroxide Mediated Living Radical Polymerization of Styrene in Emulsion", Macromolecules, vol. 31, No. 12, pp. 4041–4044, 1998.

J. Xia et al, "Controlled/"Living" Radical Polymerization. Homogeneous Reverse Atom Transfer Radical Polymerization Using AIBN as the Initiator", *Macromolecules,* vol. 30, No. 25, pp. 7692–7696, 1997.

S. A.F. Bon et al, "Controlled Radical Polymerization in Emulsion", *Macromolecules,* vol. 30, No. 2, pp. 324–326, 1997.

*Macromolecules*"Evidence for Living Radical Polymerization of Methyl Methacrylate with Ruthenium Complex: Effects of Protic and Radical Compounds and Reinitiation from the Recovered Polymers," T. Nishikawa et al., vol. 30, No. 8, 1997, pp. 2244–2248, 1997.

T. Makino et al, "Controlled Atom Transfer Radical Polymerizations of Methyl Methacrylate under Micellar Conditions", pp. 288–289.

"Controlled "Living" Emulsion Polymerization of Methyl Methacrylate by Atom Transfer Radical Polymerization", pp. 90–134, (Part 2 of "AAP" Documents Above).

J.S. Wang et al, "Controlled Sequential and Random Radical Copolymerization of Styrene and Butyl Acrylate" Polym. Prepr. (ACS) 36(1), 1995, 465.

*Takayuki OTSU et al,* "Synthesis, Reactivity, And Role of Vinylbenzyl N, N–Diethyldithiocarbamate as a Monomer–Iniferter In Radical Polymerization", Macromolecules, vol. 19, No. 2, pp. 287–290, 1986.

PREPARATION OF NOVEL HOMO- AND COPOLYMERS USING ATOM TRANSFER RADICAL POLYMERIZATION

BACKGROUND OF THE INVENTION

This application is a continuation of application Ser. No. 09/206,980, filed on Dec. 8, 1998, allowed, which is a Division of application Ser. No. 08/940,985, filed on Sep. 30, 1997 (now U.S. Pat. No. 5,945,491) which is a Division of application Ser. No. 08/677,828, filed on Jul. 10, 1996 (now U.S. Pat. No. 5,789,487).

FIELD OF THE INVENTION

This invention relates to a novel method for preparing new homo- and co-polymers by Atom Transfer Radical Polymerization and novel compositions of homo- and co-polymers thereof exhibiting narrow polydispersing index.

DESCRIPTION OF THE RELATED ART

The formation of block or graft copolymers of non-vinyl polymers with vinyl monomers by a radical mechanism, has been reported to have been achieved by two methods. One is the use of an end functional polymer which can react with an and or pendent groups of the second polymer; the second method is to use a starting step-grown polymer as a macroinitiator and grow the vinyl polymer from it, or the use of a monofunctional vinyl polymer in a step growth polymerization with AA and BB monomers.

However, both of the above methods have certain limitations. The first method requires that well defined vinyl polymers with known functionalities be made. The other method requires that functional groups must be present at the ends of the polymer (block) or dispersed along the polymer backbone (graft) which can react with those on the vinyl polymer. Also, if the vinyl polymer is not compatible with the growing polycondensation polymer the polymerization will result in incomplete formation of a block or graft copolymer and a mixture of homopolymers. In the second method, by using conventional radical polymerization, the generation of a radical at either a pendent group or at a chain and results not only in the synthesis of homopolymer, due to transfer to monomer or polymer, but also may lead to the formation of crosslinked gels.

Thus, a polymerization can be initiated by decomposition of a functional group (azo, peroxy, etc.) either in the macroinitiator's backbone or along a pendent side group, Scheme 1. Further, an irreversible activation of a functional group can take place at the polymer chain ends or attached to a pendent side group, Scheme 2.

Scheme 1

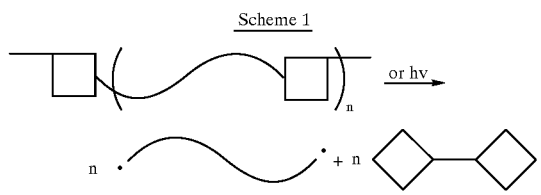

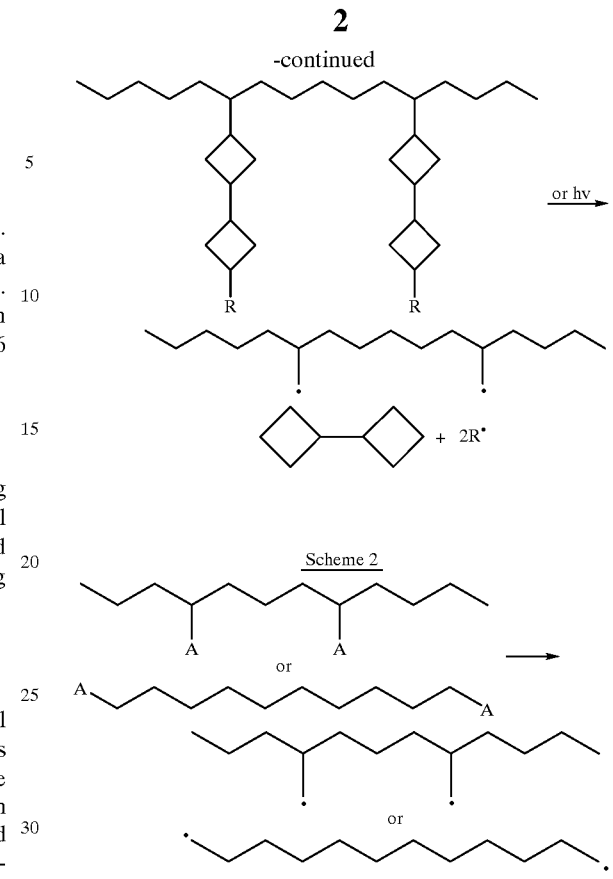

The decomposition of functional groups in a macroinitiator backbone is accomplished by copolymerization of a functional monomer during the synthesis of the macroinitiator. The functional monomer contains a functional group which can decompose. These radicals can then initiate the polymerization of a vinyl polymer to form a block copolymer. If more than one functional group is present in the macroinitiator, then the chain can be broken into smaller chains which have radicals at both ends.

In the literature, there are some examples of the incorporation of azo groups in the backbone of polymer chains. Akar et al (Polym. Bull. 1986, 15, 293) and Hizal et al (Polymer, 1989, 30 722) use a difunctional cationic initiator with a central azo group. After the synthesis of a polymer by cationic polymerization, the azo group can be decomposed to form polymer chains with a radical at one end capable of initiating radical polymerization. This results in the formation of AB block copolymers.

Udea et al (Kobunshi Ronbunshu, 1990, 47, 321) discusses the use of azodiols, as comonomers, in condensation polymerizations allowing for the introduction of more than one azo group per polymer chain. Decomposition of this macroinitiator in the presence of vinyl monomer results in the formation of AB block copolymers.

Azodiamines have reportedly been used (Vaslov et al. Makromol. Chemie 1985, 183, 2635) as a comonomer in the ring-opening polymerization of N-carboxy anhydrides in the synthesis of polypeptides. Again, these polymers are macroinitiators which can form ABA triblocks by decomposition, followed by initiation of a radical polymerization.

ABA block copolymers have also been synthesized by macroinitiators which have azo groups at the ends of the polymer chain. These macroinitiators were synthesized by the reaction of an azo compound, which had an acid chloride functional group, with the diol end groups of poly(ethylene oxide) (PEO) or poly(dimethylsiloxane) (PDMS) (Harabaglu, Makromol. Chem. Rapid Commun., 1990, 11,433). Decomposition of the azo end groups resulted in either a PEO or PDMS macro radical. When this was done in the presence of a vinyl monomer, ABA polymers were synthesized. However, a radical complementary to the macroradical was also generated resulting in the formation of homopolymer.

Macroinitiators with side chain azo groups (Kerber et al., Makromol. Chem. 1979, 180,609; Nuyken et al., Polym., Bull 1989, 21,23) or peroxyester (Neckers, J. Radiat. Curing 1983, 10, 19; Gupta, J. Polym. Sci., Polym. Chem. Ed. 1982, 20, 147) groups were used in the synthesis of graft copolymers. These macroinitiators were synthesized by the use of comonomers in step-growth polymers. These systems also formed homopolymer upon decomposition of the peroxyester.

Another category of macroinitiators are those which possess a functional group that can be activated to form a radical. One such example is reported by Bamford, (Bamford, New Trends in the Photochemistry of Polymers; Elsevier Applied Science Publishers, London, 1985) when trichloro polymer end groups were irradiated in the presence of manganese pentacarbonyl. In the presence of a monomer, block copolymers were formed.

Polystyrene with dimethylamino end groups, when irradiated in the presence of 9-fluorenone and a monomer, gave block copolymers (Yagci, Polymer Commun; 1990, 31,7). This was done by formation of a radical through the reaction of the dimethyl amine and the triplet state of the aromatic ketone. By analogy, graft copolymers were synthesized by using poly(styrene-co-p-N,N'-dimethylamino styrene) as the macroinitiator (Kinstle et al., J. Radiat. Curing 1975, 2, 7).

Although these methods have produced block and graft copolymers, the materials that have been prepared are not well defined. In most cases, homopolymers of the vinyl monomers are formed due to transfer to monomer during the radical polymerization or because of a second radical formed during the decomposition of the azo or peroxy group, Scheme 1. In the synthesis of graft copolymers, crosslinked gels can be formed if termination of the growing vinyl polymer is by combination. The molecular weights of the grafts or blocks that are synthesized by the radical polymerizations are not well defined. Also, not all of the azo (or peroxy) groups may decompose and/or initiate polymerization during the synthesis of a block or graft copolymer. Because of incomplete initiation, the number of grafts, or length of blocks cannot be accurately predicted.

Thus, there is a need for a method to prepare block and graft copolymers that are well defined and free of homocopolymer.

Further, Flory (Flory, P. J. J. Am. Chem. Soc., 1952, 74,2718) first theorized that the copolymerization of a difunctional monomer with $AB_2$ (see definition below) monomers would lead to branched structures. In his proposal, the density of branching could be controlled by varying the relative concentration of $AB_2$ monomer to difunctional monomer. This proposal was first put to use in the step-growth synthesis of polyphenylenes by Kim and Webster. (Webster, O. W.; Kim, Y. H. J. Am Chem. Soc., 1990, 112,4592; Webster, O. W., Kim, Y. H., Macromolecules 1992, 25,5561). Subsequently, it was extended to other step-growth polymerization such as aromatic (Frechet, J. M. J.; Hawker, C. J.; Lee, R. J. Am. Chem. Soc. 1991, 113,4583.) and aliphatic (Hult, A.; Malmstrom, E.; Johansson, M. J. Polym. Sci. Polym. Chem. Ed. 1993, 31,619) esters, siloxanes (Mathias, L. J.; Carothers, T. W. J. Am. Chem. Soc. 1991, 113,4043) and amines (Suzuki, M.; Li, A.; Saegusa, T. Macromolecules 1992, 25,7071). Later, it was extended to cationic chain growth polymerizations by Frechet et al., (Frechet, J. M. J.; Henmi, M.; Gitsov, L.; Aoshima, S.; Leduc, M.; Grubbs, R. B. Science 1995, 269, 1080). Shortly afterwards, it was adapted to radical polymerizations by Hawker et al. (Hawker, C. J.; Frechet, J. M. J.; Grubbs, R. B.,; Dao, J., J. Am. Chem. Soc. 1995, 117, 10763) and by Gaynor et al (Gaynor, S. G.; Edelman, S. Z.; Matyjaszewski, K., ACS PMSE Preprints 1996, 74; Gaynor, S. G.; Edelman, S. Z.; Matyjaszewski, K. Macromolecules, 1996, 29,1079).

Further, polymers containing polar groups, such as polyacrylonitrile (PAN) are prepared in general by a free radical polymerization method. W. Berger et al. (Makromol. Chem., Macromol. Symp., 1986, 3, 301), describes such a free radical polymerization method for PAN. However, the free radical polymerization of acrylonitrile (AN) does not produce a polymer with well defined structure and narrow polydispersity index. Further, such free radical polymerization method is not suitable for the preparation of block copolymers.

Polyacrylonitrile has also been prepared by a polymerization method using an anionic initiator. Such a method is described by Sogah et al (Macromolecules, 1987, 20, 1473); in general, anionic polymerization provides for control of molecular weight distribution by means of the "living" nature of its propagating chain with monomers such as styrene, diene and most non-polar acrylic monomers. However, in the polymerization of monomers with polar groups, such as acrylonitrile, the carbanion initiator attacks the polar group thus losing part of the "living" nature of the polymerization method. These defects have been partly overcome by carrying out the polymerization at very low temperature; this condition, however, renders the process impractical for commercial production of polymers containing polar groups, such as PAN.

Further, Higashimura et al., (Macromolecules, 1993, 26, 744) has described "living" cationic polymerization of styrene with an initiating system based on 1-phenylethyl chloride (1-PhEtCl) and tin tetrachloride ($SnCl_4$) in the presence of tetra-n-butyl ammonium chloride (n-$Bu_4$NCl) in methylene chloride as solvent. In addition, polymers with a variety of terminal functionalities can be obtained by "living" cationic polymerization and some of the end functions may be useful for initiating another polymerization to give block copolymers. Thus, well defined block copolymers by the transformation of initiating sites from "living" cationic to anionic polymerization have been described by Gadkari et al. (J. Appl. Polym. Sci., Appl. Polym. Symp., 1989, 44, 19), Liu et al. (J. Polym. Sci., A, Polym. Chem. 1993, 31, 1709); Nemes et al. (J. Macromol. Sci., 1991, A28, 311); Kennedy et al. (Macromolecules, 1991, 24, 6567); Kitayama et al. (Polym. Bull. (Berlin) 1991, 26, 513); Ruth et al. (Polym. Prepr. 1993, 34, 479); Nomura et al. (Macromolecules 1994, 27, 4853) and Nomura et al. (Macromolecules 1995, 28, 86), The disadvantage of these techniques is that they include numerous steps, and the number of monomers that can be used with any of the above-described methods is limited to those which can be polymerized by cationic or anionic methods. However, none of the prior art processes results in a polymer with as narrow polydispersity index as the present invention.

It is well known to those skilled in the art of polymers that when the polydispersity index of a polymer is wide the polymer contains polymeric segments with substantial smaller and larger molecular weight segments than the number average molecular weight of the polymer. On the one hand, low molecular weight segments have an adverse effect on physical properties of the polymer such as tensile strength, elongation and flexural madulus; while segments of very large molecular weight result in high melt viscosity of the polymer and, thus, in inferior processability of the polymer. Thus, there is a need for a polymer with well defined and narrow polydispersity index.

Atom Transfer Radical Polymerization (ATRP) has been described by Wang et al (in J. Am. Chem. Soc., 1995, 36, 2973; and in Macromolecules, 1995, 28, 7572). However, polar monomers, such as acrylonitrile, have not been successfully polymerized by ATRP as of now.

Thus, there is a need for a method to prepare block or graft copolymers with well defined lengths and or number of blocks or grafts that can be tailor made and that a precise number of grafts can be grown from the polymer backbone.

There is also a need for a controlled polymerization of polar monomers, such as acrylonitrile (AN) that can produce a polymer with a narrow polydispersity index and under industrially acceptable conditions.

There is also a need for polymeric materials of controlled architecture and narrow polydispersity index that may optionally contain polar groups that enhance solvent resistance properties. There is, for instance, a need for solvent resistant thermoplastic acrylate elastomers. Thermoplastic elastomers in the context of the present invention are block copolymers consisting of at least two different polymeric segments (blocks), which are thermodynamically incompatible and have different glass transition temperatures (Tg).

SUMMARY OF THE INVENTION

Accordingly, Applicants have discovered a novel method which produces a homo- or co-polymer, which may a block or a graft copolymer, and which may optionally contain at least one polar functional group; the copolymer further exhibits a narrow polydispersity index $(M_w/M_n;$ where $M_w$ is the weight average molecular weight and $M_n$ is the number average molecular weight); furthermore, this method can be carried out under conditions suitable for commercial utilization. Further, Applicants have discovered that when certain macroinitiators are synthesized and used in ATRP, well defined block and graft copolymers can be obtained.

Thus, it is another object of the present invention to provide a method to synthesize block copolymers by transformation of "living" carbocation into "living" radical polymerization.

It is another object of the present invention to provide a novel method for the synthesis of a macroinitiator for "living" radical polymerization and for the synthesis of a well defined block or graft copolymer where the macroinitiator constitutes at least one segment of the block copolymer.

It is another object of the present invention to provide a method to prepare a polymer, optionally containing at least one polar group, such as nitrile, which exhibits a narrow polydispersity index.

It is another object of the present invention to provide a polymer composition which optionally contains at least one polar group, and where the polymer exhibits a narrow polydispersity index.

It is another object of the present invention to provide a method for the preparation of a block copolymer, optionally comprising at least one polymer block segment containing at least one polar group, and where the block copolymer exhibits a narrow polydispersity index.

It is another object of the present invention to provide a method to synthesize a branched or hyperbranched macromolecule by atom or group transfer radical polymerization.

It is a further object of the present invention to provide for a block or graft copolymer of polysulfone, polyester, or functionalized polyolefins, such as the ones produced by Shell under the Kraton name.

Accordingly, there is provided a method for atom (or group) transfer radical polymerization, encompassing the polymerization of a vinyl monomer in the presence of an initiating system, which includes: an initiator having a radically transferrable atom or group, a transition metal compound, and a ligand; the polymerization forms a macroinitiator of formula (I):

$$(\text{macromolecule})\text{-}(X)_n \qquad (I)$$

wherein each X is a halogen atom and n is an integer of 1 to 100; this macromonomer is then used in the presence of a vinyl monomer, a transition metal compound, and a ligand to form a block or graft copolymer, exhibiting a well defined molecular architecture.

DESCRIPTION OF THE PREFERRED EMBODIMENTS

Figure 1A:
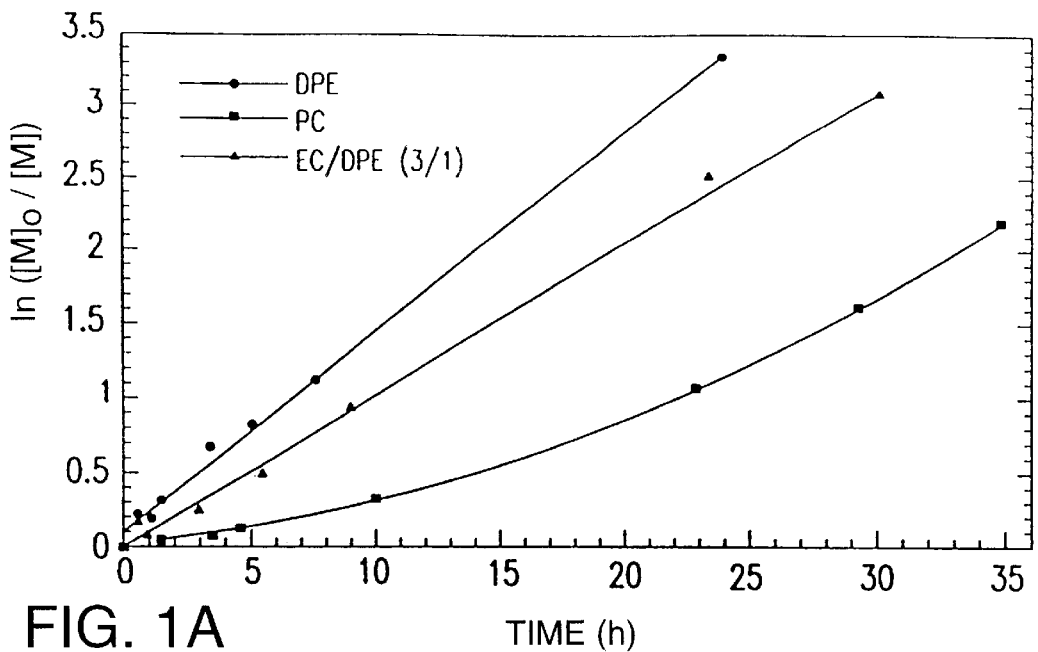
FIG. 1 shows kinetic and molecular weight behavior plots for the polymerization of 2-ethylhexylacrylate by atom transfer radical polymerization.
Figure 1B:
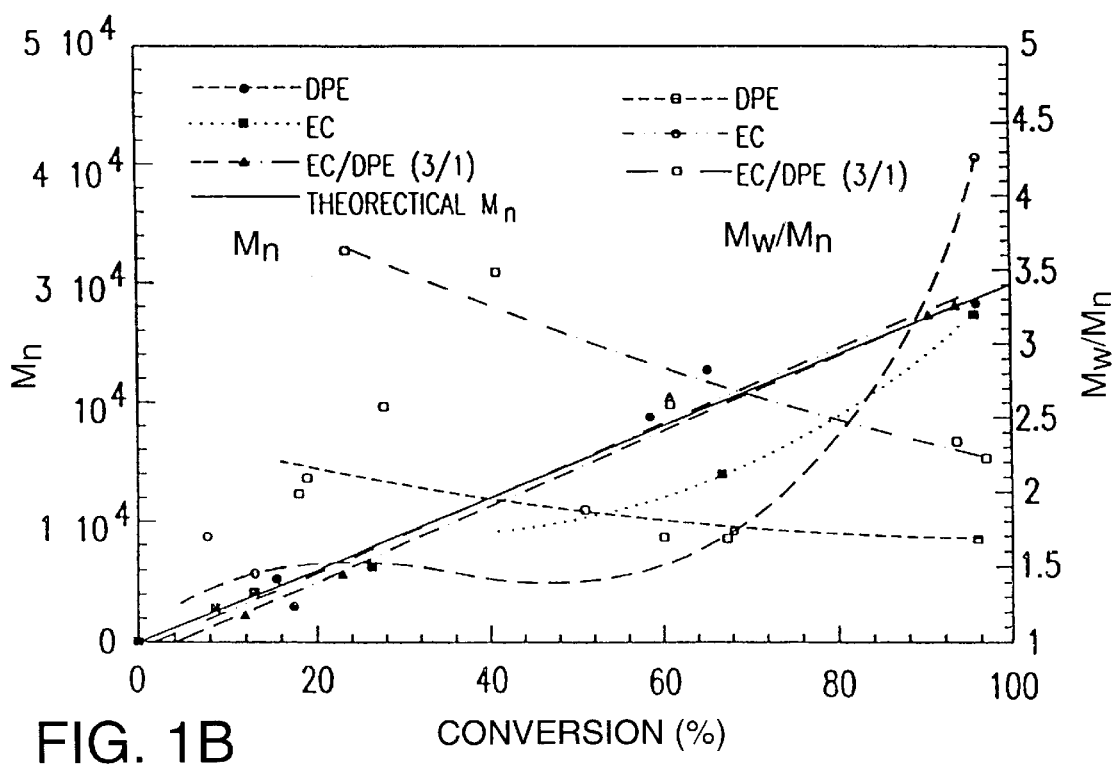
Figure 2A:
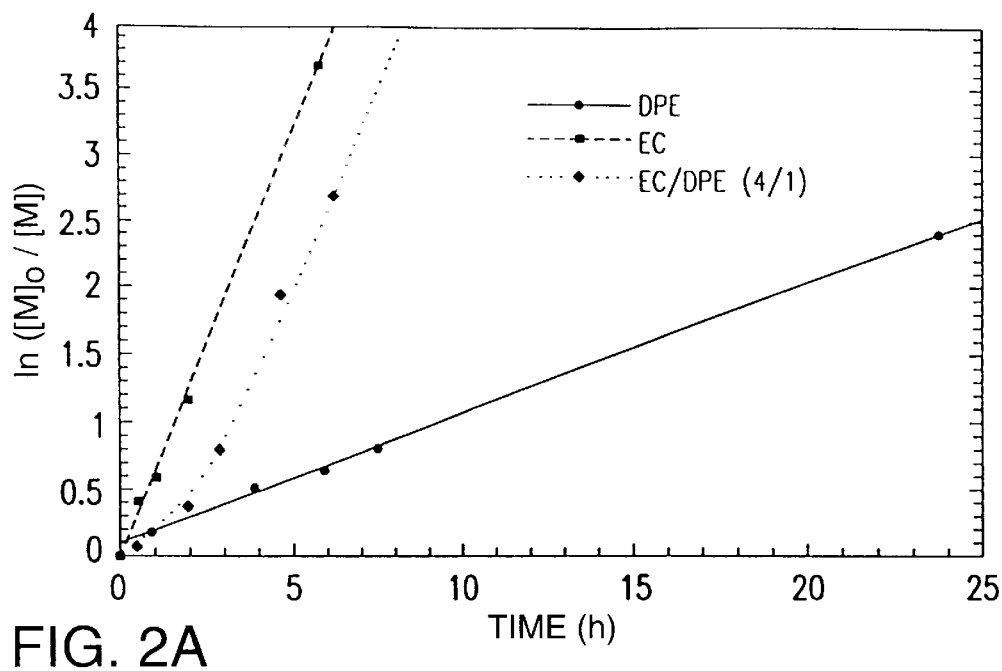
FIG. 2 shows kinetic plots and molecular weight behavior for the polymerization of N-butylacrylate by atom transfer radical polymerization.
Figure 2B:
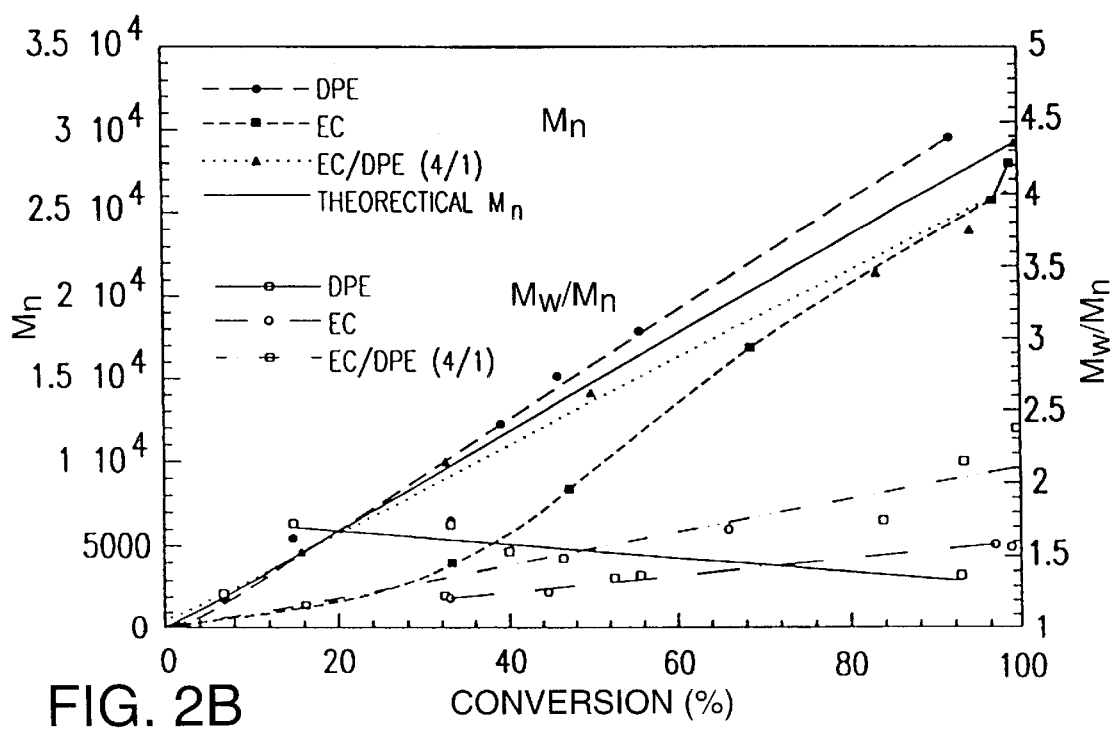
Figure 3A:
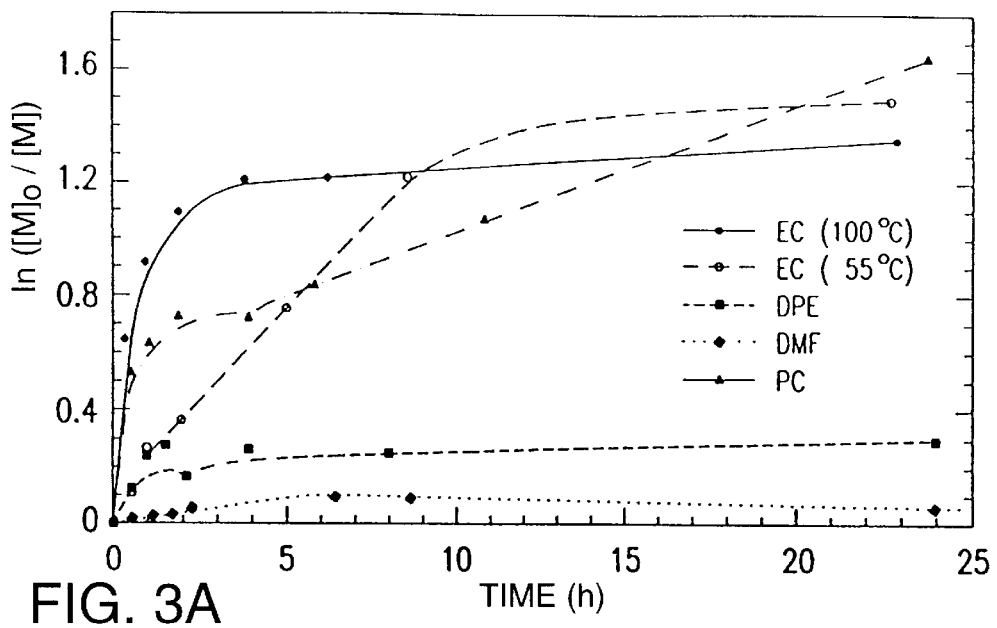
FIG. 3 shows kinetic and molecular weight behavior plots for the polymerization of acrylonitrile by atom transfer radical polymerization.
Figure 3B:
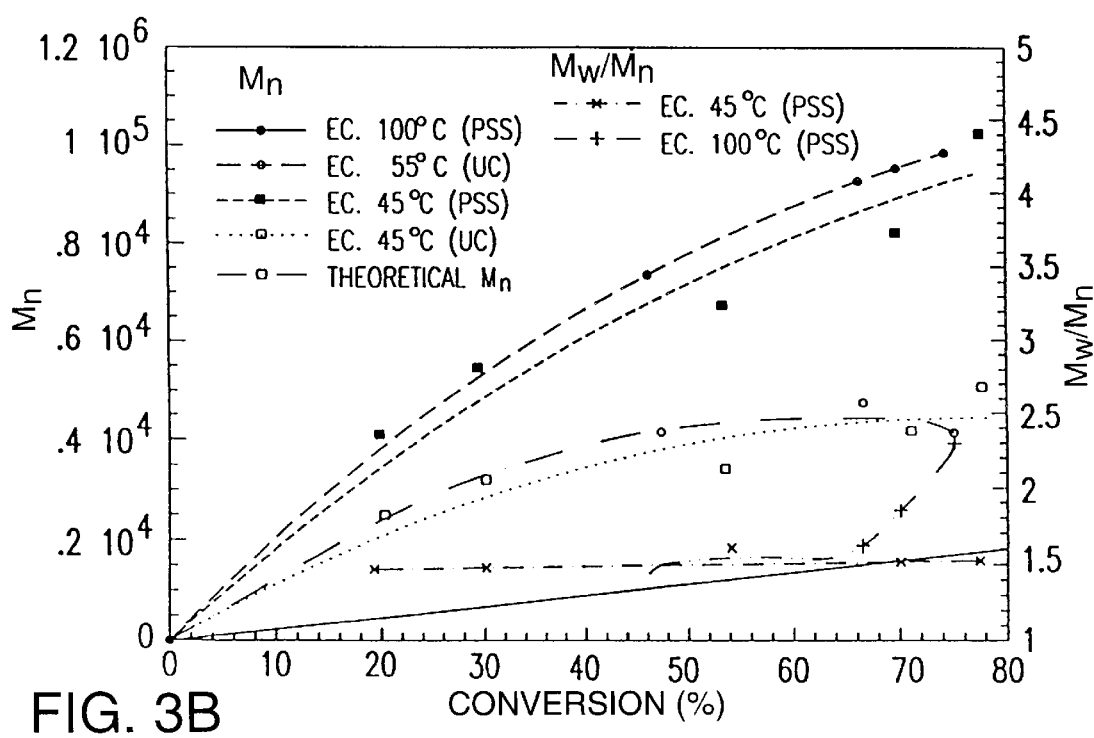
Figure 4:
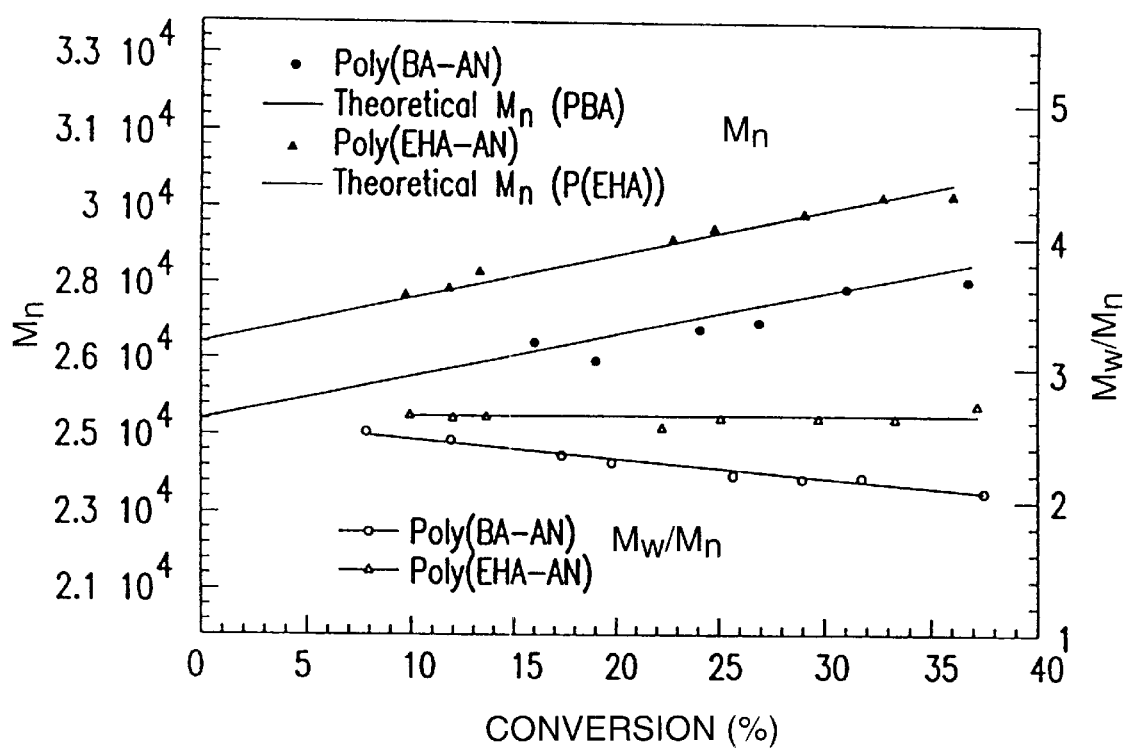
FIG. 4 shows number average molecular weight $(M_n)$, polydispersity index $(M_w/M_n)$ versus conversion plots for the block copolymerization of acrylonitrile using Br-(PEHA)-Br and Br-(PBA)-Br as the initiator in diphenylether (DPE).

The present invention provides for an atom (or group) transfer radical polymerization to form a homopolymer or a copolymer of a monomer, optionally containing at least one polar group, polymer (A). The polymerization is accomplished in accordance with the present invention in the presence of an initiating system comprising components (i), (ii) and (iii), and described below, to form a polymer.

In addition, the present invention provides for the preparation of a macroinitiator, which can be used in place of component (i) of the initiating system, thus providing for the formation of a block or graft copolymer consisting of at least one block of the macroinitiating moiety and at least one block of polymer (A).

In addition, the present invention provides a method to synthesize novel block or graft copolymers by transformation of a controlled carbocationic polymerization into controlled radical polymerization.

Further, the present invention provides a method to synthesize branched and hyperbranched macromolecules by atom transfer radical polymerization.

Further, the present invention provides for the synthesis of novel attachable macroinitiators.

In the context of the present application, the term "macromolecule" refers to a molecule containing a large number of monomeric units and having a number average molecular weight ($M_n$) of at least 500. Further, the term "macroinitiator" refers to a macromolecule having at least one initiating site. The term "macromonomer" refers to a macromolecule having at least one polymerizable site. In addition, the term "living" initiating moiety (anionic, cationic or radical) refers to an initiating moiety that substantially does not undergo termination reaction and thus, polymerization continues until substantially all the monomer is exhausted.

Polymer (A) is a homopolymer, or a block or graft copolymer of copolymerizable monomers, optionally at least one of which contains at least one polar group.

(I) Monomers

In the present invention any radically polymerizable alkene containing a polar group can serve as a monomer for polymerization. The preferred monomers include those of the formula (II):

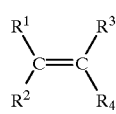

(II)

wherein $R^1$ and $R^2$ are independently selected from the group consisting of H, halogen, $CF_2$, straight or branched alkyl of 1 to 20 carbon atoms (preferably from 1 to 6 carbon atoms, more preferably from 1 to 4 carbon atoms), aryl, α, β-unsaturated straight or branched alkenyl or alkynyl of 2 to 10 carbon atoms (preferably from 2 to 6 carbon atoms, more preferably from 2 to 4 carbon atoms), α, β-unsaturated straight or branched alkenyl of 2 to 6 carbon atoms (preferably vinyl) substituted (preferably at the α-position) with a halogen (preferably chlorine), $C_3$–$C_8$ cycloalkyl, hetercyclyl, C(=Y)$R^6$, C(=)N$R^6R^7$ and YC(=Y)$R^8$, where Y may be N$R^8$ or O (preferably O), $R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched $C_1$–$C_{20}$ alkyl and aryl; and $R^3$ is selected from the group consisting of H, halogen (preferably fluorine or chlorine), $C_1$–$C_6$ (preferably $C_1$) alkyl, COO$R^9$ (where $R^9$ is H, an alkali metal, or a $C_1$–$C_6$ alkyl group) or aryl; or $R^1$ and $R^3$ may be joined to form a group of the formula (CH$_2$)$_{n'}$, (which may be substituted with from 1 to 2n' halogen atoms or $C_1$–$C_4$ alkyl groups) or C(=O)—Y—C (=O), where n' is from 2 to 6 (preferably 3 or 4) and Y is as defined above; or $R^4$ is the same as $R^1$ or $R^2$ or optionally $R^4$ is a CN group;

at least two of $R^1$, $R^2$, and $R^3$ are H or halogen.

In the context of the present application, the terms "alkyl", "alkenyl" and "alkynyl" refer to straight-chain or branched groups (except for $C_1$ and $C_2$ groups).

Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from about 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups includes pyridyl, furyl, pyrrolyl, hienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyrrole, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyramidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group may be protected at that position with a conventional blocking or protecting group, such as a $C_1$–$C_6$ alkyl group, a tris-$C_1$–$C_6$ alkylsilyl group, an acyl group of the formula $R^{10}CO$ (where $R^{10}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl" also applies to the heterocyclyl groups in "heterocyclyloxy" and "heterocyclic ring.")

More specifically, preferred monomers include (but not limited to) styrene, p-chloromethylstyrene, vinyl chloroacetate, acrylate and methcrylate esters of $C_1$–$C_{20}$ alcohols, isobutene, 2-(2-bromopropionoxy) ethyl acrylate, acrylonitrile, and methacrylonitrile.

The monomer containing at least one polar group may be present in an amount of 5 to 100 wt % by weight based on the total amount of monomers. A preferred amount of the monomer containing at least one polar group is 10 to 100 wt %; the most preferred amount is 20 to 100 wt % based on the total amount of monomers. This is particularly important in the case of acrylonitrile because an amount of at least 20 wt % assures solvent resistance properties of the resulting polymer A.

(II) Initiating System

The initiating system for the atom or group transfer radical polymerization of the present invention containing components (i), (ii) and (iii) as described below.

component (i)-initiator

Suitable initiators include those of the formula (III):

$$R^{11}R^{12}R^{13}C-Z' \qquad (III)$$

where:

$Z'$ is selected from the group consisting of Cl, Br, I, $OR^{16}$ (as defined above), $SR^{14}$, $SeR^{14}$, —SCN (thiocyanate), $OC(=O)R^{14}$, $OP(=O)R^{14}$, $OP(=O)$ $(OR^{14})_2$, OP (=O) $OR^{14}$, O—$N(R^{14})_2$ and S—$C(=S)N(R^{14})_2$, where $R^{14}$ is aryl or a straight or branched $C_1$–$C_{20}$ (preferably $C_1$–$C_{10}$) alkyl group, or when an $N(R^{14})_2$ group is present, the two $R^{14}$ groups may be joined to form a 5-, 6- or 7-membered heterocyclic ring (in accordance with the definition of "heterocyclyl" above); and $R^{11}$, $R^{12}$ and $R^{13}$ are each independently selected from the group consisting of H, halogen, $C_1$–$C_{20}$ alkyl (preferably $C_1$–$C_{10}$ alkyl and more preferably $C_1$–$C_6$ alkyl), $C_3$–$C_8$ cycloalkyl, $C(=Y)R^5$, $C(=Y)NR^6R^7$ (where $R^5$–$R^7$ are as defined above), COCl, OH (preferably only one of $R^{11}$, $R^{12}$ and $R^{13}$ is OH), CN, $C_2$–$C_{20}$ alkenyl or alkynyl (preferably $C_2$–$C_6$ alkenyl or alkynyl, and more preferably vinyl), oxiranyl, glycidyl, aryl, heterocyclyl, aralkyl, aralkylene (aryl-substituted alkenyl, where aryl is as defined above, and alkenyl is vinyl which may be substituted with one or two $C_1$–$C_6$ alkyl groups and/or halogen atoms, preferably chlorine), , $C_1$–$C_6$ alkyl in which from 1 to all of the hydrogen atoms (preferably 1) are replaced with halogen (preferably fluorine or chlorine where 1 or more hydrogen atoms are replaced, and preferably fluorine, chlorine or bromine where 1 hydrogen atom is replaced) and $C_1$–$C_6$ alkyl substituted with from 1 to 3 substituents (preferably 1) selected from the group consisting of $C_1$–$C_4$ alkoxy, aryl, heterocyclyl, $C(=Y)R^6$ (where $R^6$ is as defined above), $C(=Y)NR^4R^7$ (where $R^6$ and $R^7$ are as defined above), oxiranyl and glycidyl; such that no more than two of $R^{11}$, $R^{12}$ and $R^{13}$ are H (preferably no more than one of $R^{11}$, $R^{12}$ and $R^{13}$ is H).

In the present initiator, X is preferably Cl or Br.

When an alkyl, cycloalkyl, or alkyl-substituted aryl group is selected for one of $R^{11}$, $R^{12}$ and $R^{13}$, the alkyl group may be further substituted with an X group as defined above. Thus, it is possible for the initiator to serve as a starting molecule for branch or star (co)polymers. Preferred example is where one of $R^{11}$, $R^{12}$ and $R^{13}$ is phenyl substituted with from one to five $C_1$–$C_6$ alkyl substituents, each of which may independently be further substituted with a X group (e.g., α- , α-dibromoxylene, hexakis(α-chloro- or α-bromomethyl)-benzene).

Preferred initiators include 1-phenylethyl chloride and 1-phenylethyl bromide (e.g., where $R^{11}$=Ph, $R^{12}$=$CH_3$, $R^{13}$=H and X=Cl or Br), chloroform, carbon tetrachloride, 2-bromopropionitrile, $C_1$–$C_6$-alkyl esters of a 2-halo-$C_1$–$C_6$-carboxylic acid (such as 2-chloropropionic acid, 2-bromopropionic acid, 2-chloroisobutyric acid, 2-bromoisobutyric acid, etc.) and compounds of the formula $C_6H_x(CH_2Y')_y$, where Y' is Cl or Br, x+y=6 and Y≧1. More preferred initiators include 1-phenylethyl chloride, 1-phenylethyl bromide, methyl 2-chloropropionate, ethyl 2-bromoisobutyrate, α, α'-dichloroxylene, α, α'-dibromoxylene and hexakis(α-bromomethyl)benzene. The initiator, in accordance with the present invention, is exemplified (but not limited to) an alkyl halide, aralkyl halide or haloalkyl ester. Generally, an aromatic halide such as α, α'-dihalo-p-xylene, benzyl halide, 1-phenylethyl halide and α-haloacrylate are suitable initiators. However, initiators with a cyano group such as haloacetonitrile or halopropionitrile are more effective in the preparation of polymer (A) with narrow polydispersity index. In addition, although any of the halogens is suitable as the halide part of the initiator according to the present invention, bromine or chlorine are preferred.

component (ii)—transition metal compound

Any transition metal compound which can participate in a redox cycle with the initiator and dormant polymer chain, but which does not form a direct carbon-metal bond with the polymer chain, is suitable for use in the present invention. Preferred transition metal compounds are those of the formula 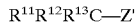, where:

$M_t^{n+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $Rh^{3+}$, $Rh^{4+}$, $Co^+$, $Co^{2+}$, $Re^{2+}$, $Re^{3+}$, $Ni^+$, $Ni^+$, $Mn^{3+}$, $Mn^{4+}$, $V^{2+}$, $V^{3+}$, $Zn^+$, $Zn^{2+}$, $Au^{30}$, $Au^{2+}$, $Ag^+$ and $Ag^{2+}$;

X' is selected from the group consisting of halogen, $C_1$–$C_{20}$-alkoxy, $(SO_4)_{1/2}$, $(PO_4)_{1/3}$, $(HPO_4)_{1/2}$, $(H_2PO_4)$, triflate, (thiocyanate), hexafluorophosphate, alkylsulfonate, arylsulfonate (preferably benzenesulfonate or toluenesulfonate), $SeR^{14}$, CN and $R^{15}CO_2$, where $R^{14}$ is as defined above and $R^{15}$ is H or a straight or branched $C_1$–$C_{20}$ alkyl group (preferably methyl), a benzoic acid derivative, aryl or a heteroaryl group which may be substituted from 1 to 5 times with a halogen (preferably 1 to 3 times with fluorine or chlorine); and n is the formal charge on the metal (e.g., $0 \leq n \leq 7$). As component (ii) a transition metal halide is required. Although any transition metal is suitable in the present invention, a preferred transition metal (but not limited to) is Cu(I). Likewise, the preferred counter ion for the transition metal is chlorine or bromine.

component (iii)—ligand

Suitable ligands for use in the present invention include ligands having one or more nitrogen, oxygen, phosphorus and/or sulfur atoms which can coordinate to the transition metal through a σ-bond, , and ligands containing tow or more carbon atoms which can coordinate to the transition metal through a π-bond. However, preferred N-, O-, P- and S- containing ligands may have one of the following formulas:

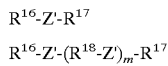

$$R^{16}\text{-}Z'\text{-}R^{17}$$

$$R^{16}\text{-}Z'\text{-}(R^{18}\text{-}Z')_m\text{-}R^{17}$$

where:

$R^{16}$ and $R^{17}$ are independently selected from the group consisting of H, $C_1$–$C_{20}$ alkyl, aryl, heterocyclyl, and $C_1$–$C_6$ alkyl substituted with $C_1$–$C_6$ alkoxy, $C_1$–$C_4$ dialkylamino, C(=Y)$R^5$, C(=Y)$R^6R^7$ and YC(=Y)$R^8$, where Y, $R^5$, $R^6$, $R^7$ and $R^8$ are as defined above; or $R^{16}$ and $R^{17}$ can be joined to form a saturated, unsaturated or heterocyclic ring as described above for the "heterocyclyl" group;

Z' is O, S, $NR^{19}$ or $PR^{19}$, where $R^{19}$ is selected from the same group as $R^{16}$ and $R^{17}$, each $R^{18}$ is independently a divalent group selected from the group consisting of $C_2$–$C_4$ alkylene (alkanediyl) and $C_2$–$C_4$ alkenylene where the covalent bonds to each Z' are at vicinyl positions (e.g., in a 1,2-arrangement) or at β-positions (e.g., in a 1,3-arrangement), and from $C_3$–$C_8$ cycloalkanediyl, $C_3$–$C_8$ cycloalkenediyl, arenediyl and heterocyclylene where the covalent bonds to each Z are at vicinal positions; and m is from 1 to 6.

In addition to the above ligands, each of $R^{16}$—Z' and $R^{17}$—Z' can form a ring with the $R^{18}$ group to which the Z' is bound to form a linked or fused heterocyclic ring system (such as is described above for "heterocyclyl"). Alternatively, when $R^{16}$ and/or $R^{17}$ are heterocyclyl, Z' can be a covalent bond (which may be single or double), $CH_2$ or a 4- to 7-membered ring fused to $R^{16}$ and/or $R^{17}$, in addition to the definitions given above for Z'. Exemplary ring systems for the present ligand include bipyridine, bipyrrole, 1,10-phenantholine, a cryptand, a crown ether, etc., where Z' is $PR^{19}$, $R^{19}$ can also be $C_1$–$C_{20}$-alkoxy.

Included as suitable ligands are pyridine derivatives which contain substituents in the 2 or 2 and 6 position such as a carbonyl containing moiety, an imine containing moiety or a thioketone containing moiety.

Also included as suitable ligands in the present invention are CO (carbon monoxide), porphyrins and porphycenes, the latter two of which may be substituted with from 1 to 6 (preferably from 1 to 4) halogen atoms, $C_1$–$C_6$ alkyl groups, $C_1$–$C_6$-alkoxy groups, $C_1$–$C_6$ alkoxycarbonyl, aryl groups, heterocyclyl groups, and $C_1$–$C_6$ alkyl groups further substituted with from 1 to 3 halogens.

Further ligands suitable for use in the present invention include compounds of the formula $R^{20}R^{21}C(C(=Y)R^5)_2$, where Y and $R^5$ are as defined above, and each of $R^{20}$ and $R^{21}$ is independently selected from the group consisting of H, halogen, $C_1$–$C_{20}$ alkyl, aryl and heterocyclyl, and $R^{20}$ and $R^{21}$ may be joined to form a $C_3$–$C_8$ cycloalkyl ring or a hydrogenated (i.e., reduced, non-aromatic or partially or fully saturated) aromatic or heterocyclic ring (consistent with the definitions of "aryl" and "heterocyclyl" above), any of which (except for H and halogen) may be further substituted with 1 to 5 and preferably 1 to 3 $C_1$–$C_6$ alkyl groups, $C_1$–$C_6$ alkoxy groups, halogen atoms and/or aryl groups. Preferably, one of $R^{20}$ and $R^{21}$ is H or a negative charge.

Additional suitable ligands include, for example, ethylenediamine and propylenediamine, both of which may be substituted from one to four times on the amino nitrogen atom with a $C_1$–$C_4$ alkyl group or a carboxymethyl group; aminoethanol and aminopropanol, both of which may be substituted from one to three times on the oxygen and/or nitrogen atom with a $C_1$–$C_4$ alkyl group; ethylene glycol and propylene glycol, both of which may be substituted one or two times on the oxygen atoms with a $C_1$–$C_4$ alkyl group; diglyme, triglyme, tetraglyme, etc.

Suitable carbon-based ligands include arenes (as described above for the "aryl" group) and the cyclopentadienyl ligand. Preferred carbon-based ligands include benzene (which may be substituted with from one to six $C_1$–$C_4$ alkyl groups, e.g., methyl) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (X') in the transition metal compound.

Preferred ligands include unsubstituted and substituted pyridines and bipyridines (where the substituted pyridines and bipyridines are as described above for "heterocyclyl"), acetonitrile, $(R^{10}O)_3P$, $PR^{10}_3$, 1,10-phenanthroline, porphyrin, cryptands such as $K_{222}$, crown ethers such as 18-crown-6, and nitrogen or sulfur analogs of crown ethers. The most preferred ligands are substituted bipyridine, bipyridine and $(R^{10}O)_3P$. Examples of such ligands (but not limited to) are 2,2'-bipyridine, a p-alkyl substituted derivative of the 2,2'-bipyridine or a p-alkoxy substituted derivative of the 2,2'-bipyridine.

The mole ratio of the components (i), (ii) and (iii) of the initiating system may range from 1/0.01/0.02 to 1/4/12; the preferred range however is 1/0.1/0.2 to 1/2/6.

In accordance with the present invention, the components (i), (ii) and (iii) of the initiating system are introduced to a reactor, the reactor is subsequently degassed under vacuum and charged with an inert gas, such as argon. No particular order in the addition of the above components of the initiating system is required. A monomer and, optionally, a solvent is then added to the reactor through a rubber septum.

The preferred polymerization temperature to prepare polymer (A) with narrow polydispersity index, in accordance with the present invention, is 0° C. to 150° C.; it is preferred to use a reaction temperature below the boiling point of the polar group containing monomer, where a narrow polydispersity index is achieved and a loss of the polar group containing monomer is minimized.

The present polymerization may be conducted in the absence of solvent ("bulk" polymerization). However, when a solvent is used, suitable solvents include ethers, cyclic ethers, alkyl esters, aryl esters, $C_5-C_{10}$ alkanes, $C_5-C_8$ cycloalkanes which may be substituted with from 1 to 3 $C_1-C_4$ alkyl groups, aromatic hydrocarbon solvents, halogenated hydrocarbon solvents, acetonitrile, dimethylformamide, mixtures of such solvents, and supercritical solvents (such as $CO_2$, $C_1-C_4$ alkanes in which any H may be replaced with F, etc.). The present polymerization may also be conducted in accordance with known suspension, emulsion and precipitation polymerization processes.

Suitable ethers include compounds of the formula $R^{22}OR^{23}$, in which each of $R^{22}$ and $R^{23}$ is independently an alkyl group of from 1 to 6 carbon atoms which may be further substituted with a $C_1-C_4$-alkoxy group. Preferably, when one of $R^{22}$ and $R^{23}$ is methyl, the other of $R^{22}$ and $R^{23}$ is alkyl of from 4 to 6 carbon atoms or $C_1-C_4$-alkoxyethyl. Examples include diethyl ether, ethyl propyl ether, dipropyl ether, methyl t-butyl ether, di-t-butyl ether, glyme (dimethoxyethane), diglyme (diethylene glycol dimethyl ether), etc.

Suitable cyclic ethers include THF and dioxane. Suitable aromatic hydrocarbon solvents include benzene, toluene, o-xylene, m-xylene, p-xylene, and any isomer or mixture of isomers of cumene. Suitable halogenated hydrocarbon solvents include $CH_2Cl_2$, 1,2-dichloroethane and benzene substituted from 1 to 6 times with fluorine and/or chlorine, although one should ensure that the selected halogenated hydrocarbon solvent(s) does not act as an initiator under the reaction conditions.

A solvent suitable for the preparation of polymer (A) of the present invention must meet the following requirements: it must have low chain transfer constant (as defined in: Polymer Handbook, third edition, J. Brandrup and E. H. Immergut, Editors, II/81); be able to dissolve the initiating system; and must not form a complex with the initiating system. Examples of solvents suitable for the present invention (but not limited to) are: diphenylether, diaryl ether, dimethoxybenzene, propylene carbonate, and ethylene carbonate. Especially useful solvents in accordance with the present invention are propylene carbonate and ethylene carbonate which result in polymer (A) exhibiting narrow polydispersity index.

III)—Use of Macroinitiator for ATRP (a) In situ Generation of a Macroinitiator (i) Transformation of "Living" Carbocationic to "Living" Radical Polymerization A further object of the present invention is to synthesize a block copolymer by combining a "living" carbocationic polymerization with a "living" radical polymerization. "Living" cationic polymerizations have been described by Matyjaszewski (Cationic Polymerizations, Mechanism, Synthesis and Applications; Marcel Dekker, Inc., New York, 1996). Thus, a macromonomer can be synthesized by a "living" carbocationic method, having a terminal group, such as a halogen group, which subsequently can be used as an effective macroinitiator in a "living" atom or group transfer radical polymerization. Scheme 3(a) exemplifies the procedure (not limited to the particular examples) for the synthesis of poly(styrene-b-styrene), poly(styrene-b-methylacrylate) and poly(styrene-b-methylmethacrylate) copolymers. In addition, as exemplified in Scheme 3(b), a variety of ABA block copolymers with polyisobutene (PIB) mid block can be prepared.

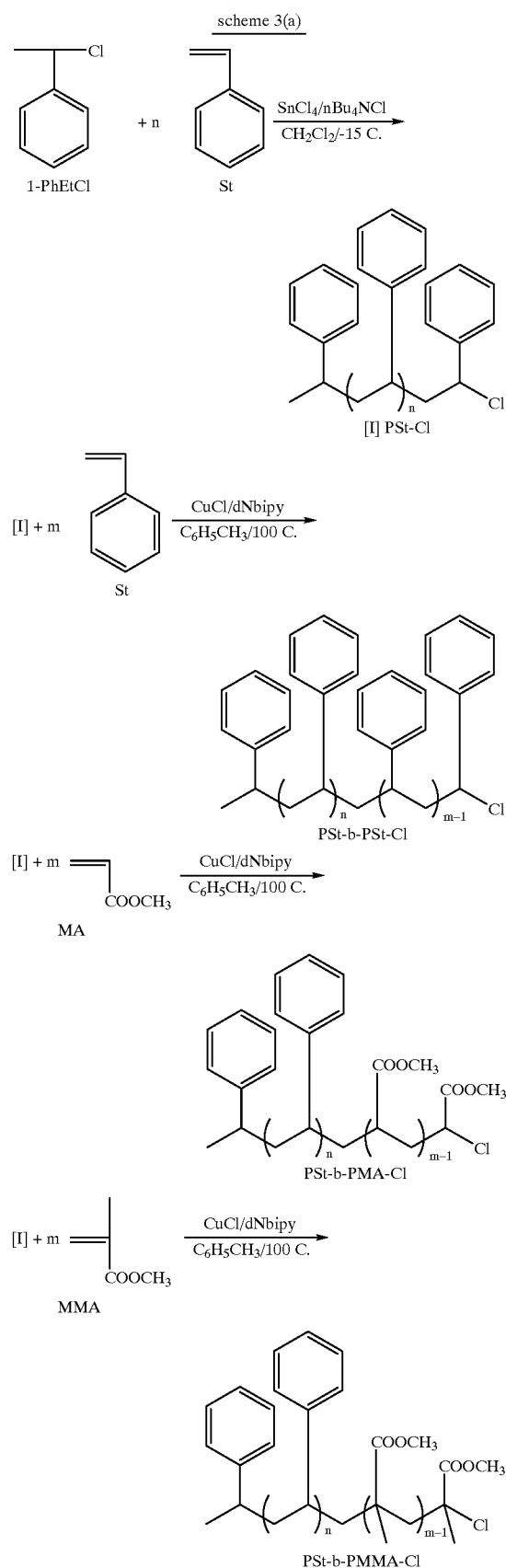

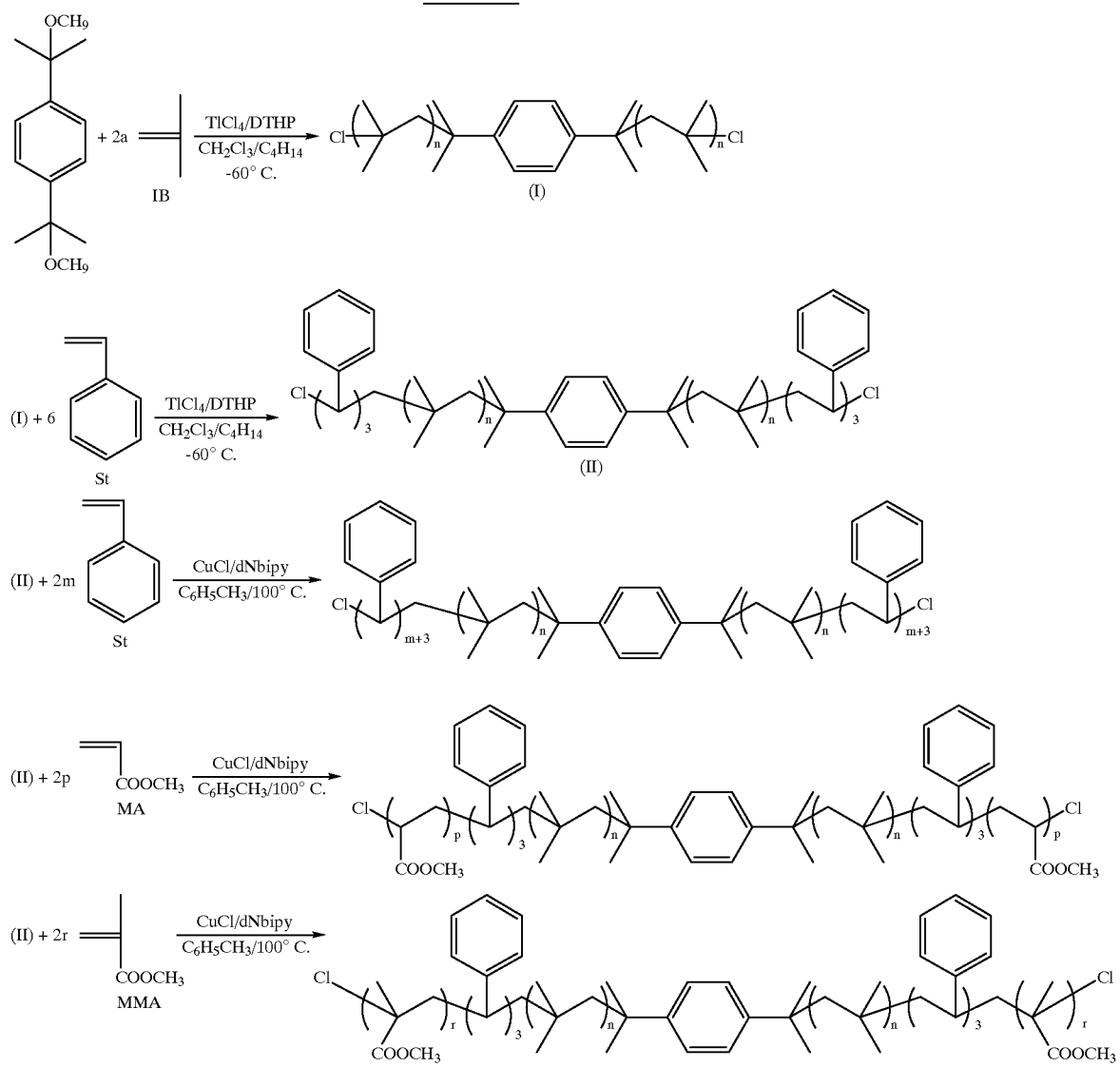

scheme 3(b)

(ii) Synthesis of macroinitiator by polyesterification

1) In situ polycondensation of a monofunctional acid and acid halide containing an activated halogen atom.

An example is the polyesterification of a diol (1.0 mol) with a diacid (0.95 mol) in the presence of 2-bromopropionic acid or chloroacetic acid (0.05 mol) to produce a polyester having a degree of polymerization (DP)=20 and α-halogen end group.

(b) Polymer Modification to Generate a Macroinitiator

Another object of the present invention is to synthesize a novel block copolymer using a novel atom or group transfer radical polymerization initiator.

Thus, according to the present invention, a compound of formula (IV):

$$Y_1-R_3-R_3{'}-(X_3)_n \qquad (IV)$$

is reacted with a macromonomer that is functionalized with a group C. The functional group C must be able to react with $Y_1$ to form a stable bond and thus the functional group $X_3$ is now added to the macromonomer. The addition of the group $X_3$ to the macromonomer transforms the monomer into a macroinitiator for ATRP. This macroinitiator is used as component (i) of the initiating systsem to polymerize a vinyl monomer in the presence of a transition metal compound (component (ii)), and a ligand (component (iii)) to form a block copolymer. In formula (IV), $X_3$ is a halogen (preferentially chlorine or bromine), n is an integer of 1 to 100, preferentially of 1 to 10, $Y_1$ is any functional group such as (but not limited to) hydroxyl, carboxyl, amine, —SiH or —C(=O)—X, where X is a halogen. $R_3$ is selected from the group consisting of alkyl, aryl and aralkyl group, as defined above, and $R_3{'}$ is a $C_1$–$C_{20}$-alkyl group.

This novel method for the preparation of a block copolymer can best be understood in the scheme 4 below:

Scheme 4

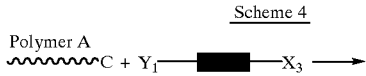

-continued

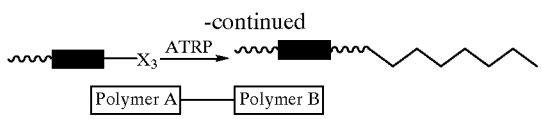

Suitable macroinitiators are macromonomers containing at least one functionality such as (but not limited to) hydroxyl, carboxyl, vinyl, amine or thiol. Preferred monomers are acrylic and methacrylic acid esters having from 1 to about 20 carbon atoms in the alcohol moiety, styrene, vinyl substituted styrene, such as α-alkyl styrene or ring substituted styrene such as p-alkyl styrene; such monomers are commercially available or can be easily prepared by known esterification processes. Preferred esters are n-butyl acrylate, ethyl acrylate, methyl methacrylate, isobornyl methacrylate and 2-ethylhexyl acrylate; preferred styrenic monomers are styrene, α-methyl styrene, p-methyl styrene, p-tert-butyl styrene, p-acetoxy styrene and ring-halogenated styrene.

The following exemplify (but are not limited to) methods of synthesis of multifunctional polymers which can be used in the synthesis of block and graft copolymers in accordance with the present invention.

1) Esterification of hydroxy and phenoxy and groups with halo acid halide.

An Example in accordance with this object is polysulfone prepared with an excess of Bisphenol A, esterified with excess of 2-bromopropionyl bromide to provide a polymer with two bromopropionyl end groups.

2) Incorporation of benzyl chloride end groups by hydrosilation process.

A polymer containing two unsaturated end groups at both ends, exemplified by a divinyl terminated polydimethylsiloxane (PDMS), is reacted with H—SiMe$_2$—PhOCH$_2$—Cl in the presence of Pt catalyst.

3) Polydimethylsiloxane (PDMS) containing Si—H groups at the terminal or as pendant units is reacted with p-chloromethylstyrene (p-ClMeSt) in the presence of Pt catalyst to yield PDMS with terminal or pendant benzyl chloride groups.

The resulting polymer can be presented by:

$$(\text{macromolecule})-(X_1)_n$$

where $X_1$ is a halogen and n is an integer of from 1 to 100, preferentially from 1 to 10. Thus, the resulting halogenated macromolecule can subsequently be used as component (i) of the initiating system for the preparation of a polymer optionally containing at least one polar group; the result of the polymerization with the above-discussed macroinitiator may be an ABA block copolymer with the end blocks being a vinyl polymer and the middle block being any polymer.

Examples of novel block or graft copolymers produced by macroinitiators in accordance with the present invention include (but are not limited to) block copolymers containing a block moiety of polysiloxane, polyester, polysulfone or polyamide, or ethylene/butylene copolymer such as the ones produced by Shell under the Kraton name.

II. AB$_2$ Monomers and Their Use in ATRP

AB$_2$ monomer is defined as a hybrid molecule containing polymerizable double bond (B$_2$) and an atom or group (A) which can be cleaved homolytically and reversibly.

Atom Transfer Radical Polymerization (ATRP) allows for the controlled radical polymerization of (meth)acrylic esters, (meth)acrylonitrile, dienes and styrenic monomers. For AB$_2$ monomers to be used in ATRP, it is required that they have the basic structure of B-R-F, where B is the polymerizable double bond, R is an organic spacer group, and F is a functional group containing a halogen atom which can be homolytically, yet reversibly, cleaved by reaction with copper(I) salts. For example, the B group can be methacrylic, acrylic, or styrenic in nature. The F group could be a benzylic halide, 2-halopropionate, etc. The versatility of this approach is enhanced by the wide variety of R groups that can be inserted between the double bond and the functional group.

Acrylic AB$_2$ monomers can be synthesized by the reaction of, for example (but not limited to), 2-hydroxyethyl acrylate or 2-hydroxyethyl methacrylate with an acid halide, either 2-bromopropionyl bromide, 2-bromoisobutyryl bromide, or chloroacetyl chloride.

The homolytic cleavage of group A can occur at the stage of monomer, polymer or both. Group A becomes group A' when it is pendent or A" when it is at the chain end of a macromonomer. Thus, the following possibilities can occur depending on the relative reactivities of A, A' and A":

a) Description of Reactivity of A-group
  (i) Homopolymerization
    1) Reactivity of group A in monomer is similar to reactivity of groups A' and A" in the polymer.
Examples include (but are not limited to) ATRP of p-chloromethylstyrene, 2-(2-bromopropionoxy)ethyl acrylate, etc., which result in a hyperbranched structure with cluster ("grape bunch") structure.
    2) Reactivity of A>>A' (no A" but reactivity A~A")
Examples include (but are not limited to) ATRP of p-chlorosulfonylstyrene, vinyl chloroacetate, etc., which result in a linear "condensation" polymer with pendant A" groups.
    3) Reactivity of A=A'; no A"
Examples include (but are not limited to) free radical polymerization (FRP) of p-chloromethylstyrene, 2-(2-bromopropionoxy) ethyl acrylate, etc., which result in a linear conventional free radical polymer with pendant A' groups.
    4) Reactivity of A<<A'<A"
Examples include (but are not limited to) ATRP of chloroacrylates, chloroacrylonitrile, etc., which result in a nearly perfect dendritic structure (no cluster due to lack of terminal B$_2$ bonds).

Polymers 1–4 above are reacted with styrene, (meth) acrylate, or acrylonitrile, etc. to yield block and graft copolymers by the process of the present invention. The polydispersity of the resulting copolymer is: $M_w/M_n=1.1$ to 3.0.

(ii) Simultaneous copolymerization of AB$_2$ monomer with a conventional vinyl monomer
    1) Reactivity of group A in monomer is similar to reactivity of groups A' and A" in the polymer.
Examples include (but are not limited to) ATRP of styrene/p-chloromethylstyrene, butyl acrylate/2-(2-bromopropionoxy) ethyl acrylate, etc. The resulting polymers have branched structure with cluster ("grape bunch") structure; branch density depends on comonomer ratio.
    2) Reactivity of A>>A' (no A" but reactivity A~A")
      Examples include (but are not limited to) ATRP of p-chlorosulfonylstyrene, vinyl chloroacetate, with styrene, etc., which result in macromonomers with vinyl acetate(VAc), branched structures possibly with p-chlorosulfonylstyrene.
    3) Reactivity of A=A'; no A"
Examples include (but are not limited to) free radical polymerization (FRP) of p-chloromethylstyrene, 2-(2- bromopropionoxy) ethyl acrylate, etc., with e.g., styrene, which result in a linear conventional free radical (FR) polymer with a few pendant A' groups 4) Reactivity of A<<A' <A"

Examples include (but are not limited to) ATRP of chloroacrylates, chloroacrylonitrile, acrylonitrile, (meth) acrylate esters, etc., with e.g., styrene which result substantially in nearly perfect dendritic structure (no cluster due to lack of terminal $B_2$ bonds) with a two layer shape due to differences in reactivity of chloroacrylates and styrene; spontaneous star like block copolymer (iii) Consecutive copolymerization 1) Reactivity of group A in monomer is similar to reactivity of groups A' and A" in the polymer.

Representative examples include (but are not limited to) ATRP of p-chloromethylstyrene, 2-(2-bromopropionoxy) ethyl acrylate, etc., followed by styrene or butyl acrylate. The result is a substantially hyperbranched core with cluster ("grape bunch") structure, star-like second layer which can be soft (low Tg segment) or soft followed by hard (high Tg) segment. Another possibility is a free radical (FR) copolymerization of p-chloromethylstyrene (pClMeSt) with styrene or butylacrylate/2-(2-bromopropionoxy) ethyl acrylate and then grafting from the backbone to get a graft copolymer.

2) Reactivity of A>>A' (no A" but reactivity A~A")

Examples include (but are not limited to) ATRP of vinyl chloroacetate with styrene, etc. This results in the formation of a macromonomer of polystyrene with a vinyl acetate end group. Another possibility is a free radical copolymerization of VClAc with VAc and then grafting from the backbone.

3) Reactivity of A=A'; no A"

Examples are the free radical polymerization (FRP) of p-chloromethylstyrene, 2-(2-bromopropionoxy)ethyl acrylate, etc, with e.g., butyl acrylate. The result is a linear free radical polymer with a few pendant A' groups. Subsequent polymerization of the second monomer by ATRP results in the formation of a comb/graft copolymer.

4) Reactivity of A<<A' <A"

Example include (but are not limited to) ATRP of chloroacrylates, chloroacrylonitrile, etc., initiated by an initiator such as sulfonyl chloride, chloromalonate, and optionally additional monomer such as styrene. The result is a nearly perfect dentritic structure (no cluster due to lack of terminal $B_2$ bonds) with a two layer shape due to differences in reactivity of chloroacrylates and styrene. Several layers of star like block copolymers can be grown.

Some examples of polymeric architecture obtained by a polymerization in accordance with the present invention follow:

(b) Hyperbranched Polymers

In this object of the present invention the $AB_2$ molecule can be presented by formula V

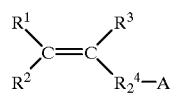

(V)

wherein $R^1$, $R^2$, and $R^3$ are as previously described and $R_2^4$ is an organic spacer group and A is selected from the group consisting of $R_2^{4'}$—X and X, where X is a halogen (preferably chlorine or bromine), and $R_2^{4'}$ is selected from the group consisting of straight or branched alkyl of from 1 to 20 carbon atoms (preferably from 1 to 6 carbon atoms, more preferably from 1 to 4 carbon atoms), α,β-unsaturated straight or branched alkenyl or alkynyl of 2 to 20 carbon atoms (preferably from 2 to 6 carbon atoms, more preferably from 2 to 4 carbon atoms), α,β-unsaturated straight or branched alkenyl of 2 to 6 carbon atoms (preferably vinyl) substituted (preferably at the α-position) with a halogen (preferably chlorine), $C_3$–$C_8$ cycloalkyl, benzyl, hetercyclyl, C(=Y)$R^5$, C(=Y)NR$^6$R$^7$ and YC(=Y)R$^8$, C(=Y)—Y—R$^5$—C(=Y)—R$^8$ where Y may be NR$^8$ or O (preferably O), $R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched $C_1$–$C_{20}$ alkyl or aryl; and $R^1$ and $R^3$ may be joined to form a group of the formula $(CH_2)_{n'}$ (which may be substituted with from 1 to 2n' halogen atoms or $C_1$–$C_4$ alkyl groups) or C(=O)—Y—C(=O), where n' is from 2 to 6 (preferably 3 to 4) and Y is as defined above.

Preferred monomers (but not limited to) are p-chloromethylstyrene (CMS), methyl-α-chloroacrylate and 2-(2-bromopropionoxy) ethyl acrylate.

The method, in accordance with the present invention, for making a hyperbranched molecule is illustrated below in scheme 5:

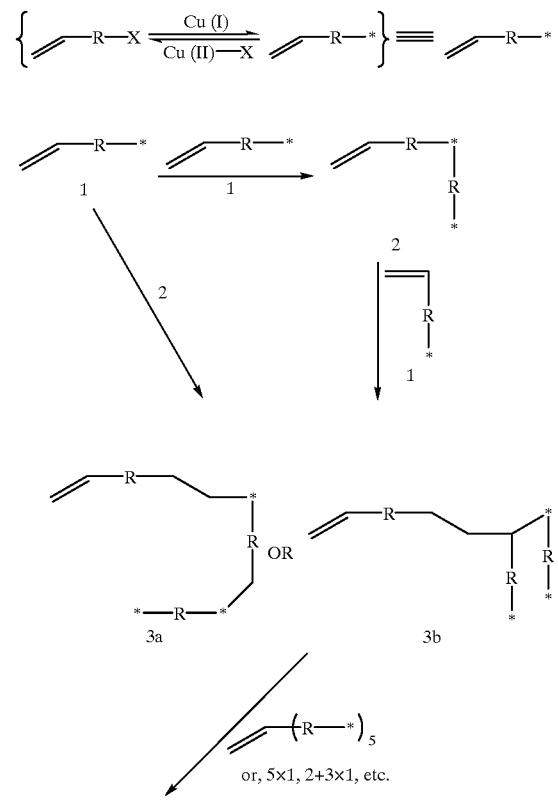

Scheme 5

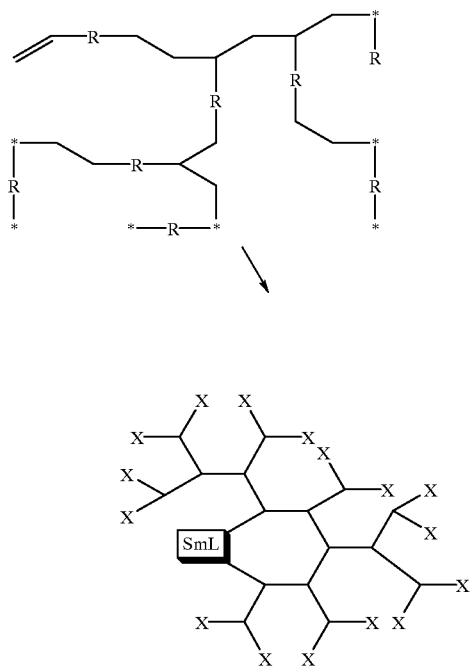

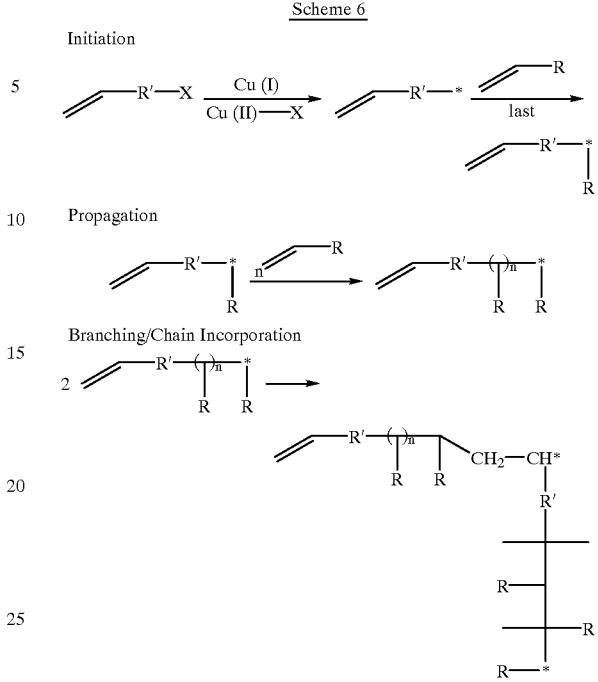

where R represents an alkyl or any ester, and X is a functional group (preferentially a halogen).

In scheme 5, the activation-deactivation process is shown in the first step and is assumed to occur throughout the polymerization. Activation occurs prior to addition of a monomer unit and deactivation after monomer addition.

Subsequent to the activation of a monomer a second monomer is added. The resulting dimer can then be activated at either side and add an additional monomer. As the new monomer is added, forming a trimer, another functional site is added to the growing macromolecule. Each functional group can be activated by Cu(I) and add additional monomer units. By repetition of this process, a hyperbranched polymer is obtained. It should be noted that each macromolecule has one double bond and nX groups, where n equals the number of repeated units. Due to the presence of the double bond in the macromolecule, the macromolecule can be incorporated into another macromolecule, similar to a step growth polymerization. In scheme 1, a molecule is advanced from a trimer to an octamer by addition of any combination of five repeat units, i.e., five monomers, a dimer or a trimer etc.

If a hyperbranched polymer is dissolved in a conventional monomer, and then activated with Cu(I), a linear chain of the second monomer can grow off the hyperbranched macromolecule. When the hyperbranched macromolecule is a multi-armed initiator, the resulting copolymer is a multi-armed star copolymer.

(c) Branched Polymers

When a monomer of formula (IV) is polymerized with a conventional vinyl monomer such as styrene, the density of the branched polymer can be attenuated by changing the amount of branching monomer used.

Scheme 6, shows the chain growth, for a copolymerization of an $AB_2$ monomer with a conventional vinyl monomer.

where R' is a monomer and X is a functional group (preferentially halogen); n is an integer of 1 to 1,000,000.

Initiation, that is the activation of a halide functional group and addition of a monomer, is fast. Fast initiation results in the formation of polymer chain (propagation) with vinyl end groups which can be incorporated into other polymer chains (branching). The rate of chain incorporation depends upon the $r_1$ and $r_2$ values for the respective monomer and the polymerizable chain-end functionality on the macromonomer ($B_2$); (reactivity ratios, "r", are defined in: Polymer Handbook, third edition, J. Brandrup and E. H. Immergut, Editors, Chapter II/153). If $r_1$ is about equal to $r_2$, then the $B_2$ chain-end is incorporated into other chains throughout the reaction. If addition of the $B_2$ end-group by the propagating radical is not favored, then the chains are not incorporated into one another until late in the polymerization or even not at all.

(d) Multi-Arm Polymers

An acrylic hyperbranched polymer of the type obtained by homopolymerization of 2-(2-bromopropionoxy) ethyl acrylate, has n halogen atoms per macromolecule, with n being equal to the number of repeat units. The halogen atoms are all alpha to a carbonyl group as a consequence of either the propagation of a radical across the acrylic double bond followed by deactivation or from monomer ends which were unchanged (the halogen atom was not homolytically abstracted, followed by propagation). As these halogen atoms are all alpha to a carbonyl group, they are good initiating sites for ATRP. After purification, the hyperbranched polymer A was used as a macroinitiator for the ATRP of butyl acrylate.

(e) Comb Polymers

Copolymerization of 2-(2-bromopropionoxy) ethyl acrylate (2-BPEA) (0.5 mol %) with butyl acrylate using a conventional radical initiator such as 2,2'-azobisisobutyronitrile (AIBN), resulted in the synthesis of a high molecular weight, linear acrylic monomer ($M_n$=215,000; $M_w/M_n$=1.6). The copolymers have pendent bromine functional groups, an estimated average of 8 per chain, which are capable of initiating a polymerization under ATRP conditions. Use of the linear butyl acrylate/2-BPEA copolymer as a macroinitiator for the ATRP of styrene (or methyl methacrylate) led to the formation of comb polymers, Scheme 7. These comb polymers have a poly(butyl acrylate) backbone and poly(styrene) (or poly(methyl methacrylate)) grafts. The resulting polymers are good elastomeric materials.

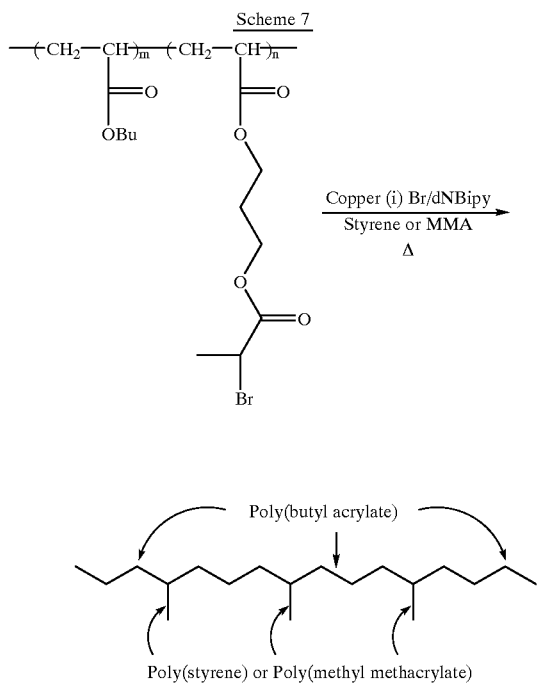

Scheme 7

Typical Polymerization Procedure

Purification of Reagents: The monomers used in the following examples were passed through aluminum trioxide to remove any inhibitors. The solvents and monomers were degassed by bubbling with argon. α,α'-Dibromo-p-xylene and 2,2'-bipyridine were recrystallized from benzene and hexane, respectively. Copper bromide and copper chloride were purified by stirring in glacial acetic acid, washed with ethanol and then dried.

Reaction Control: Monomer conversion was determined using a SHIMADZU GC-14A chromatograph with a DB-WAX, 30 m column; with THF as an internal standard. Gel permeation chromatography (GPC) measurements were carried out using Phenogel columns (100 Å, 1000 Å, linear, guard) in series with a 410 differential refractometer, using DMF (acrylonitrile, 50° C.) or THF (35° C.) as an eluent. The number average molecular weight was also obtained by $^1$H-NMR, using a 300 MHz BRUKER NMR spectrometer. The molecular weight was also determined by Matrix Assisted Laser Desorption Ionization-Time of Flight (MALDI-TOF).

Having generally described this invention, a further understanding can be obtained by reference to certain specific examples which are provided herein for purposes of illustration only and are not intended to be limiting unless otherwise specified.

EXAMPLES

Example 1

Polymerization of Acrylonitrile with α,α'-dibromo-o-xylene/CuBr/dNbipy in Various Solvents 0.2003 g ($7.595 \times 10^{-4}$ mol) of α,α'-dibromo-p-xylene, 0.2174 g ($1.519 \times 10^{-3}$ mol, of CuBr, and 0.7112 g ($4.557 \times 10^{-3}$ mol) of 2,2'-bipyridine (1/2/6 mol ratio) were added to a SCHENLK flask. The reaction flask was tightly sealed with a rubber septum, degassed under vacuum, and charged with argon. 10 mL of solvent and 10 mL (0.1519 mol) of acrylonitrile were then introduced via syringe. The reactions were carried out in diphenylether, dimethylformamide, propylene carbonate, and ethylene carbonate as reaction solvents. The reaction mixture was immersed in an oil bath heated at 45° C., 55° C. or 100° C. Samples for kinetic measurements were taken after a specific reaction time from the reaction mixture and diluted with THF. After kinetic measurement, polymers from kinetic samples were precipitated by pouring into methanol then dried. These polymers were used for GPC measurement.

The results of polymerizations were described in Table 1.

TABLE 1

Polymerization of acrylonitrile using α,α'-dibromo-o-xylene/CuBr/2,2'-bipyridine as an initiating system in several solvents.

| Entry No. | Solvent | Temp. (° C.) | [M]/[I] | Time/h | Conv. (%) | $M_n$ (GPC) | $M_w/M_n$ |
|---|---|---|---|---|---|---|---|
| 1* | diphenylether | 100 | 380 | 24 | 26 | 22000 | 1.32 |
| 2[a] | dimethylformamide | 100 | 380 | 24 | 5 | — | — |
| 3[a] | propylene carbonate | 100 | 380 | 24 | 81 | 17200 | 1.74 |
| 4[b] | " | 100 | 380 | 24 | 69 | 13900 | 2.18 |
| 5[a] | ethylene carbonate | 100 | 380 | 7 | 71 | 53100 | 1.71 |
| 6[c] | " | 55 | 200 | 8 | 87 | 40400 | 1.54 |
| 7[a] | " | 45 | 380 | 9 | 71 | 45100 | 1.34 |
| 8[d] | " | 100 | 380 | 23 | 69 | 61900 | 1.83 |

*(I)/CuBr2,2'-Bipyridine: [a](=1/2/6), [b](=1/2/4), [c](=1/2/6), [d](=1/3/6); (I) represents the initiator.

EXAMPLE 2
Polymerization of acrylonitrile with 2-chloropropionitrile/CuBr/dNbipy in ethylene carbonate 0.114 g ($7.995 \times 10^{-4}$ mol) of CuBr and 0.3746 g ($2.398 \times 10^{-3}$ mol) of 2,2'-bipyridine, and 25 g of ethylene carbonate were added to a schenlk flask. The reaction flask was tightly sealed with a rubber septum, degassed under vacuum, and charged with argon. 10 mL (0.1519 mol) of acrylonitrile and 0.1415 mL ($1.599 \times 10^{-3}$ mol) of 2-chloropropionitrile were then introduced via syringe. The reaction mixture was immersed in an oil bath heated at 47° C. or 64° C. Samples for kinetic measurements were taken after a specific reaction time from the reaction mixture and diluted with THF. After kinetic measurement, polymers from kinetic samples were precipitated by pouring into methanol, then dried. These polymers were used for GPC measurement. The polymerization of acrylonitrile using 2-chloropropionitrile/CuBr/2,2'-bipyridine (=1/2/6 mol ratio) was also carried out in the same procedure.

The results of the polymerizations are described in Table 2

TABLE 2

Polymerization of acrylonitrile using 2-chloropropionitrile/CuBr/2,2'-bipyridine as an initiating system in ethylene caromate.

| entry no. | [I]/CuBr/2.2'-bipyridine | [M]/[I] | temp (° C.) | time (h) | conv. (%) | $M_n$ (GPC) | $M_s$ (NMR) | $M_n$ (calc.) | $M_w/M_n$ |
|---|---|---|---|---|---|---|---|---|---|
| 9  | 1/0.5/1.5 | 95 | 47 | 48 | 86 | 25600 | —    | 4300 | 1.16 |
| 10 | 1/0.5/1.5 | 95 | 64 | 48 | 93 | 29500 | 6700 | 4700 | 1.11 |
| 11 | 1/2/6     | 95 | 47 | 24 | 36 | —     | —    | —    | —    |

[I] represents the initiator

EXAMPLE 3
Polymerization of acrylonitrile with 2-bromopropionitrile/CuBr/dNbipy in ethylene carbonate The polymerizations using acrylonitirle/2-bromopropionitrile (=95 and 190 mol ratio) and 2-bromopropionitrile/CuBr/2,2'-bipyridine (=1/1/3, 1/0.5/1.5, and 2/0.1/0.3 mol ratio) were carried out in ethylene carbonate in similar procedure to example 2. The polydispersities and the molecular weights of polymers at several reaction times were described in Table 3.

TABLE 3

Polymerization of acrylonitrile using 2-bromopropionitrile/CuBr/2.2'-bipyridine as an initiating system in ethylene carbonate at 64° C.

| entry no. | [I]/CuBr/2,2'-bipryridine | [M]/[I] | temp. (° C.) | time (h) | conv. (%) | $M_n$ (GPC) | $M_n$ (NMR) | $M_n$ (calc.) | $M_w/M_n$ |
|---|---|---|---|---|---|---|---|---|---|
| 12 | 1/1/3     | 94  | 44 | 5  | 73 | 32800 | 5580 | 3680 | 1.3  |
|    |           |     |    | 10 | 84 | 35300 | 6060 | 4230 | 1.24 |
|    |           |     |    | 23 | 91 | 37300 | 6450 | 4590 | 1.34 |
| 13 | 1/0.5/1.5 | 95  | 44 | 5  | 81 | 28400 | 4490 | 4060 | 1.07 |
|    |           |     |    | 10 | 89 | 29600 | 5910 | 4460 | 1.11 |
|    |           |     |    | 23 | 94 | 31900 | 6200 | 4750 | 1.12 |
| 14 | 1/0.1/0.3 | 95  | 44 | 5  | 31 | 11600 | 2200 | 1550 | 1.05 |
|    |           |     |    | 10 | 32 | 13300 | 2610 | 1590 | 1.04 |
|    |           |     |    | 23 | 38 | 15600 | 3030 | 1930 | 1.04 |
| 15 | 1/0.5/1.5 | 95  | 64 | 5  | 91 | 28400 | 5820 | 4570 | 1.11 |
|    |           |     |    | 10 | 95 | 30400 | 6120 | 4760 | 1.12 |
|    |           |     |    | 23 | 97 | 34200 | 6510 | 4870 | 1.10 |
| 16 | 1/0.1/0.3 | 95  | 64 | 5  | 23 | 13600 | 2560 | 1130 | 1.04 |
|    |           |     |    | 10 | 32 | 15600 | 3080 | 1630 | 1.04 |
|    |           |     |    | 23 | 49 | 18100 | 1900 | 2460 | 1.04 |
| 17 | 1/0.5/1.5 | 190 | 64 | 5  | 77 | 47000 | —    | 7710 | 1.09 |
|    |           |     |    | 9  | 81 | 47100 | —    | 8140 | 1.14 |
|    |           |     |    | 23 | 88 | 54100 | —    | 8870 | 1.12 |
| 18 | 1/0.1/0.3 | 190 | 64 | 5  | 26 | 20200 | —    | 2640 | 1.05 |
|    |           |     |    | 9  | 33 | 25200 | —    | 3310 | 1.04 |
|    |           |     |    | 23 | 48 | 31600 | —    | 4860 | 1.05 |

[I] represents the initiator

EXAMPLE 4
Polymerization of acrylonitrile with 2-chloropropionitrile/CuBr/dNbipy in ethylene carbonate The polymerizations using (acrylonitrile)/2-chloropropionitrile)/CuBr/2,2'-bipyridine (=1/0.5/1.5 mol ratio) were carried out in ethylene carbonate at 64° C. in similar procedure to example 2. The polydispersities and the molecular weights of polymers at several reaction times are described in Table 4.

The experimental values for the number average molecular weight ($M_{n,Exp}$) agree with the theoretical value of $M_n$ ($M_{n,th}$) which were calculated using expression (1):

$$M_n, th=(\Delta[M]_0/[initiator]_0) \times (M_w)_0 \times conversion \tag{1}$$

where $(M_w)_0$ is the formula weight of the monomer, which assumes that each polymer contains one halogen chain-end group. The GPC chromatograms of starting PSt-Cl and PSt-b-PSt-Cl, PSt-b-PMA-Cl and PSt-b-PMMA-Cl copoly-

TABLE 4

Polymerization of acrylonitrile using 2-chloropropionitrile/CuCl/2,2'-bipyridine as an initiating system in ethylene carbonate at 64° C.

| entry no. | [I],CuBr/2,2'-bipyeidine | [M]/[I] | time (h) | conv. (%) | $M_n$ (GPC) | $M_n$ (NMR) | $M_n$ (calc.) | $M_w/M_n$ |
|---|---|---|---|---|---|---|---|---|
| 19 | 1/0.5/1.5 | 95 | 5 | 71 | — | 3110 | 3550 | 1.21 |
|  |  |  | 9 | 89 | — | 3610 | 4460 | 1.21 |
|  |  |  | 24 | 94 | — | 4670 | 4720 | 1.21 |

[I] represents the initiator

EXAMPLE 5
Preparation of A-B-A block copolymer

Figure 5:
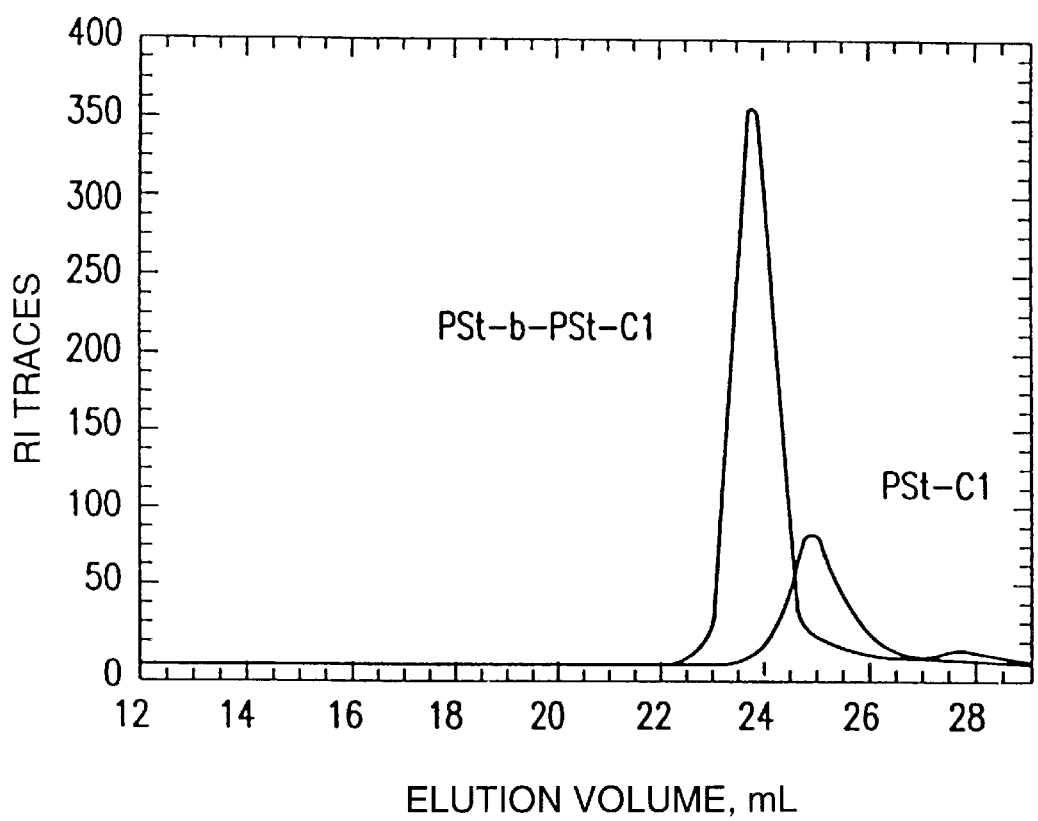
FIG. 5 shows GPC chromatograms for PSt-Cl and PSt-b-PSt-Cl polymers shows in Table 5 (exp. 1–2).
Figure 6:
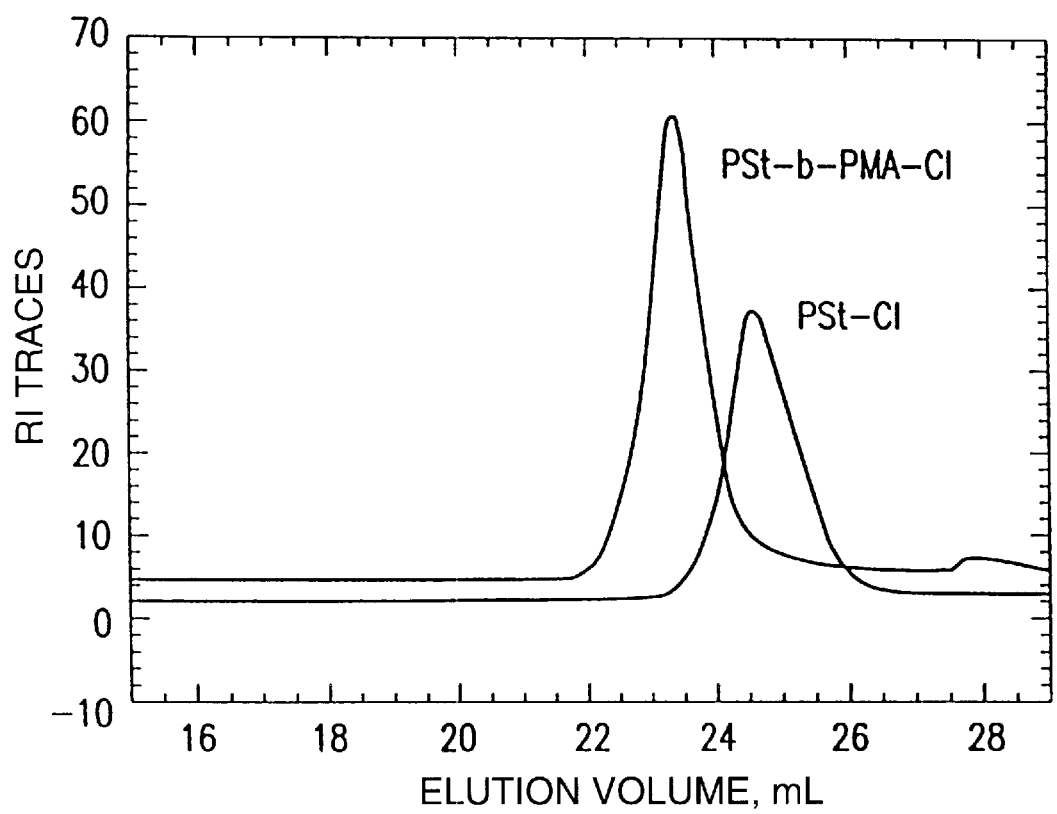
FIG. 6 shows GPC chromatograms for PSt-Cl and PSt-b-PMA-Cl polymers shown in Table 5 (exp. 1 and 3).
Figure 7:
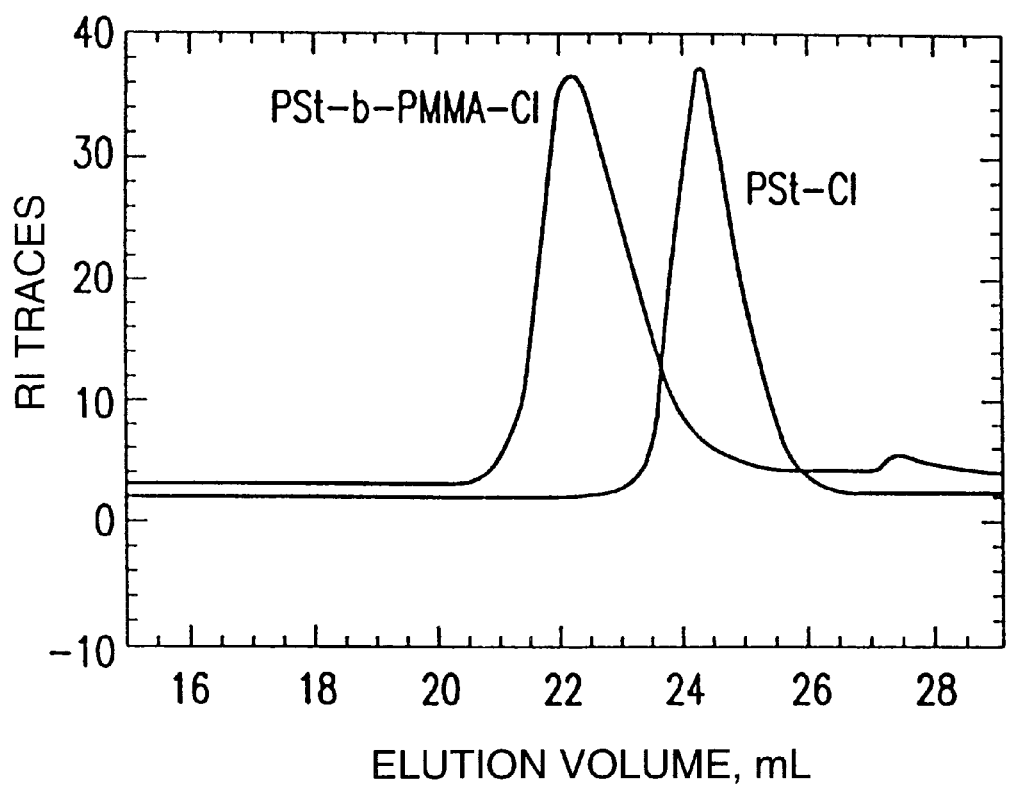
FIG. 7 shows GPC chromatograms for PSt-Cl and PSt-b-PMMA-Cl polymers show in Table 5 (exp. 1 and 4).

Macroinitiators having a poly(styrene) backbone and a halogen chain-end functionality were prepared by "living" cationic polymerization of styrene with 1-PhEtCl/SnCl$_4$ initiating system in the presence of n-Bu$_4$NCl at −15° C. in methylene chloride in a schenlk flask under dry nitrogen. The results are summarized in Table 5. After 30 minutes, the polymerization was terminated by adding prechilled methanol. The polymers were purified by repeated dissolution-precipitation in dichloromethane/methanol, and dried under vacuum. The macroinitiators thus synthesized have a narrow polydispersity index ($M_w/M_n$=1.17); end group analysis by $^1$H-NMR showed that polystyrene contain the CH$_2$CH(Ph)—Cl terminal group (broad signal at about 4.4 ppm). The polystyrene macroinitiator having halogen chain-end functionality was used as a macroinitiator in an atom transfer radical polymerization using styrene, methyl acrylate or methyl methacrylate as monomers. Table 5 summarizes representative polymerization results for cationic polymerization of styrene (exp. 1), and a homogeneous ATRP of styrene (St) (exp. 2), methyl acrylate (MA) (exp. 3) and methyl methacrylate (MMA) (exp. 4), initiated with the macroninitiator poly(styrene)-Cl (PSt-Cl) and catalzyed by CuCl/4,4'-(1-butylpentyl)-2,2'-bipyridine (dNbipy).

mers are illustrated in FIGS. 5–7. The reaction mixture of the block copolymer synthesis was diluted with THF and injected directly into the GPC in order to avoid any fractionation of the polymer sample during isolation. The GPC measurements showed that the molecular weight distribution of the block copolymers were substantially unimodal and narrow. No signal attributed to starting macroninitiator was detected.

Figure 8:
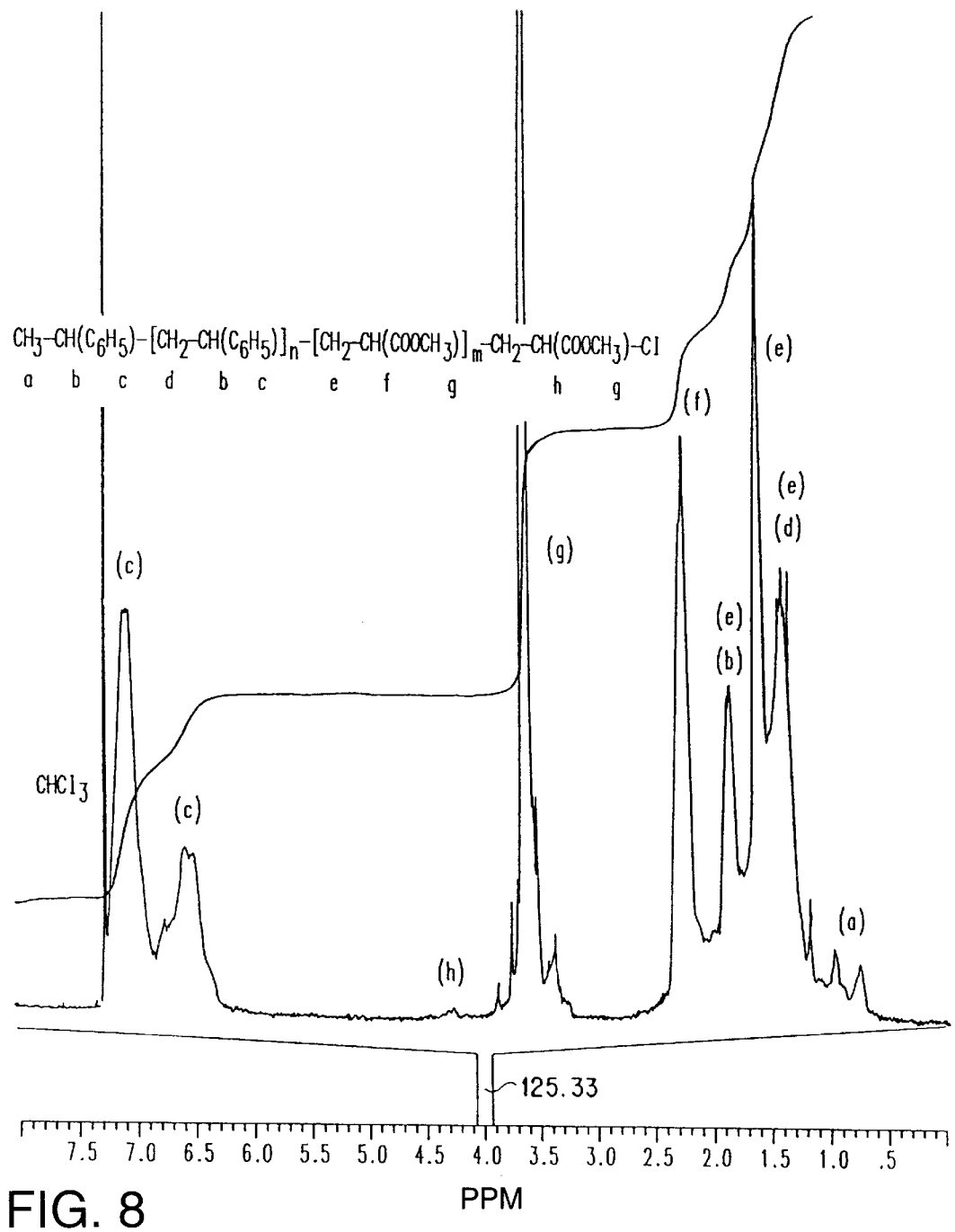
FIG. 8 shows an $^1$H-NMR spectrum (CDCl$_3$) of PSt-b-PMA-Cl copolymers [$M_n$(GPC)=6200, $M_w/M_n$=1.20, $M_n$(NMR)=6020].
Figure 9:
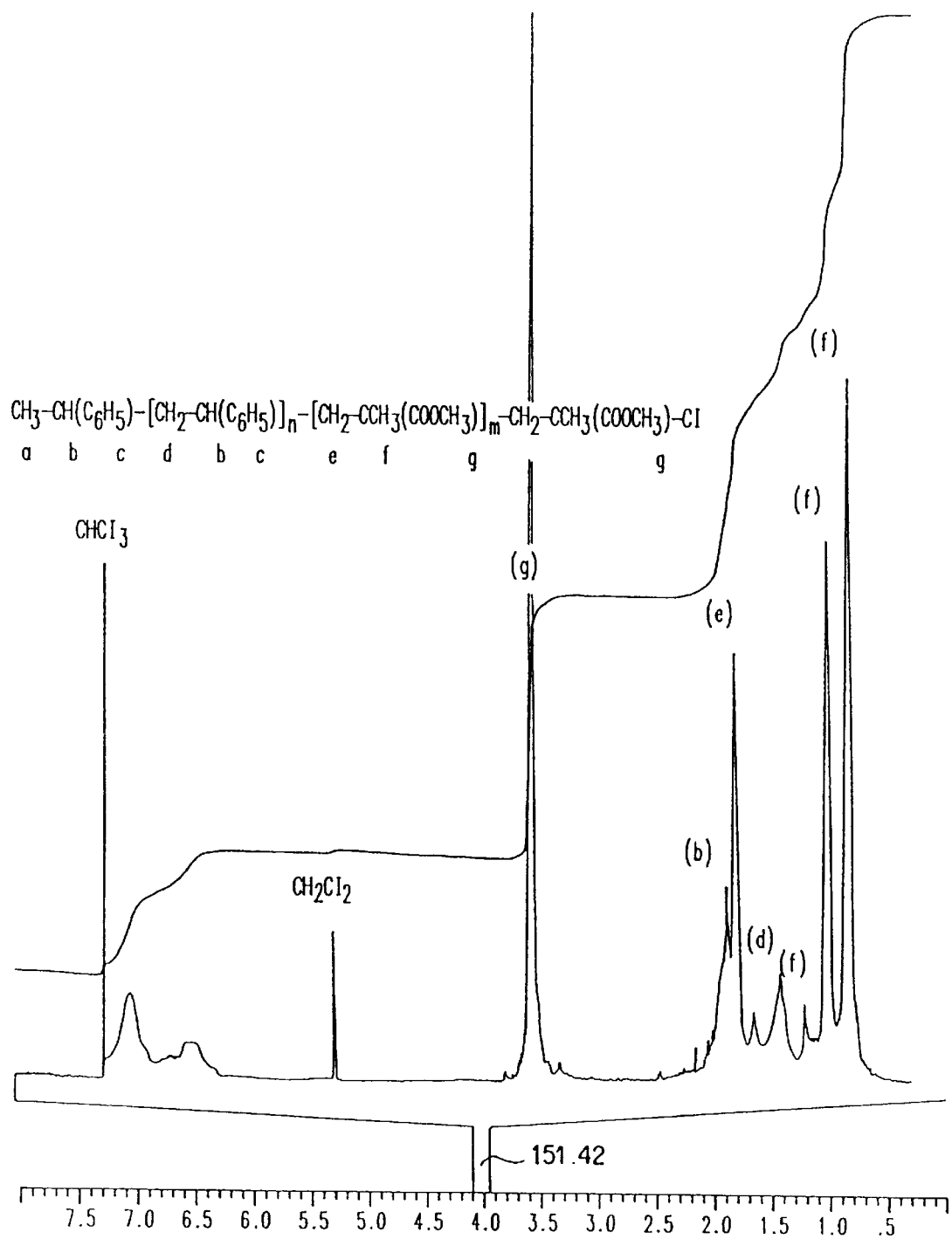
FIG. 9 shows an $^1$H-NMR spectrum (CDCl$_3$) of PSt-b-PMMA-Cl copolymers [$M_n$(GPC)=11090, $M_w/M_n$=1.57, $M_n$(NMR)=10300].

The structure of the block copolymers was analyzed by $^1$H-NMR spectroscopy. FIGS. 8 and 9 illustrate 300 MHz $^1$H-NMR spectra of PSt-b-PMA-Cl and PSt-b-PMMA-Cl copolymers. The number average molecular weight ($M_n$) determined by NMR spectra, by integration of the aromatic protons of the macroinitiator and methoxy group from PMA and PMMA, agrees very well with those determined by GPC. The tacticity of PMMA based on CH$_3$ signals was (rr)=59%, (rm)=32% and (mm)=9%.

In a schenlk flask under nitrogen, the "living" PSt-Cl macroinitiator obtained by cationic polymerization was deactivated by adding methyl acrylate at −15° C. After raising the temperature, to room temperature, CH$_2$Cl$_2$, Lewis acid and ester were removed under vacuum. A solution of CuCl-dNbipy in toluene was added to the PSt-Cl product, followed by the required amount of methyl acrylate and the temperature was increased to 100° C. Experimental

TABLE 5

Results obtained by transformation of "living" cationic to "living" radical polymerization

| Exp. | Monomer | Initiating system | Temp ° C. | $M_{n,sr}$ | $M_{n,exp}$ | $M_w/M_n$ |
|---|---|---|---|---|---|---|
| 1 | CH$_2$=CH(Ph) | 1-PhEtClSnCl$_4$/nBu$_4$NCl | −15 | 2060 | 2100 | 1.17 |
| 2 | CH$_2$=CH(Ph) | PSt—Cl/CuCl/dNbipy | 100 | 5100 | 5080 | 1.10 |
| 3 | CH$_3$=CH(COMe) | PSt—Cl/CuCl/dNbipy | 100 | 6200 | 6330 | 1.20 |
| 4 | CH$_3$=CCH$_3$(COMe) | PSt—Cl/CuCl/dNbipy | 100 | 10100 | 11090 | 1.57 |

Figure 10:
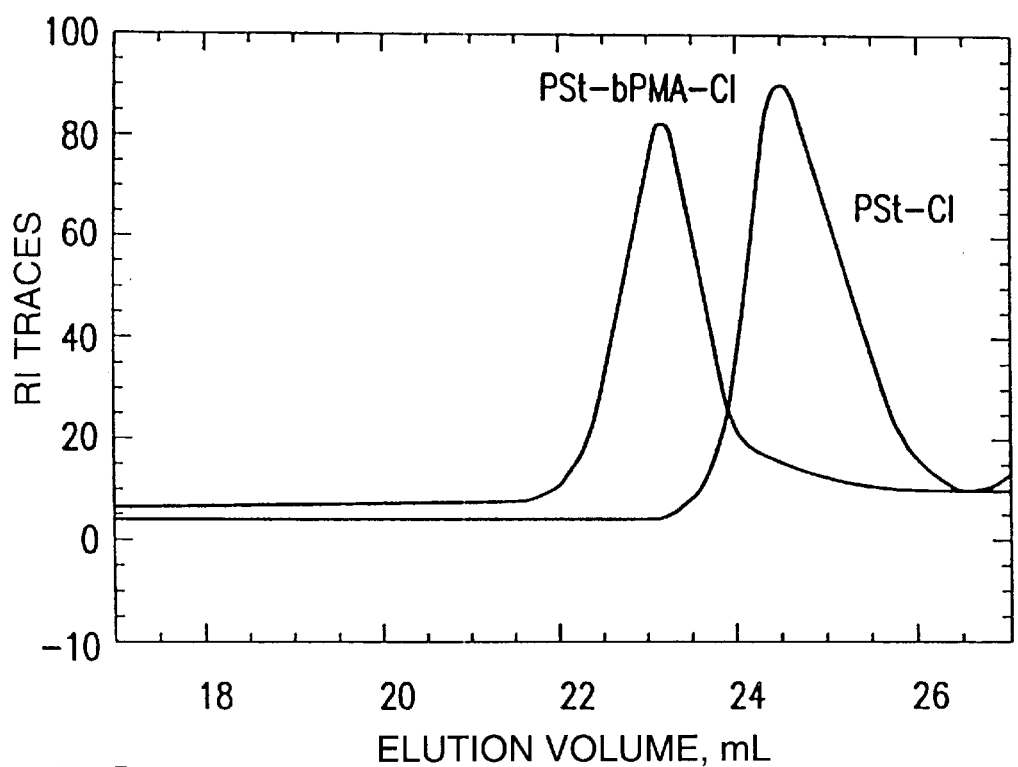
FIG. 10 shows GPC chromatograms for PSt-Cl and PSt-b-PMMA-Cl polymers obtained by one pot polymerization. Experimental conditions identical to those in Table 5 (exp. 1 and 3).
Figure 11:
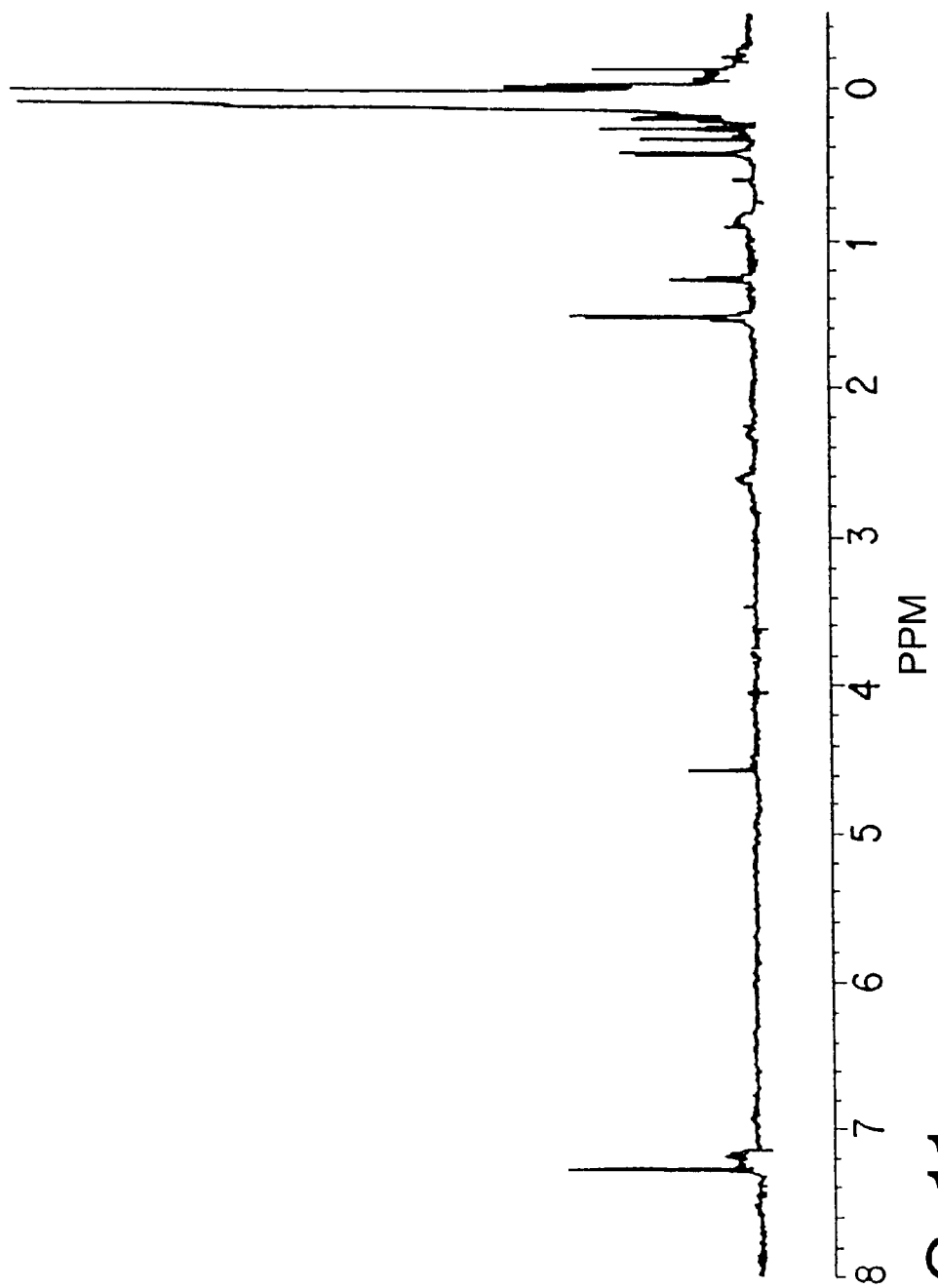
FIG. 11 shows an $^1$H-NMR spectrum of difunctional polymethylsiloxane macroinitiator.

Conditions: Exp. 1(St)$_n$ = 1 mol/L, (1-PhEtCl)$_c$ = 5 × 10$^{-1}$ mol/L,
[1PhEtCl]$_o$/[SnCl$_4$]$_o$/(nBu$_4$NCl]$_o$ = 1/5/2, CH$_2$Cl$_2$ solvent, conversion = 98%; Exp. 2 [St]$_o$ = 3 mol/L, [PSt—Cl]$_o$ = 0.1 mol/L, [PSt—Cl]hd o/[CuCl]$_o$/[dNbipy]$_o$ = 1/1/2, C$_6$H$_5$CH$_3$ solvent, conversion = 98.5%; Exp. 3 [MA]$_o$ = 4.76 mol/L, [PSt—Cl]$_o$ = 0.1 mol/L,
[PSt—Cl]$_o$/]CuCl]$_o$/[dNbipy]$_o$ = 1/1/2, C$_6$H$_5$CH$_3$ solvent, conversion = 99.5%; Exp. 4 [St]$_o$ = 8 mol/L, [PSt—Cl]$_o$ = 0.1 mol/L, [PSt—Cl]$_o$/[CuCl]$_o$/[dNbipy]$_o$ = 1/1/2, C$_6$H$_5$CH$_3$ solvent, conversion = 97.5%.

conditions identical to those summarized in Table 5 (exp. 3) were used. The GPC traces of macroinitiator and copolymer PSt-b-PMA-Cl confirm the successful on pot transformation as shown in FIG. 10.

EXAMPLE 6

Synthesis of hydperbranched Polystyrene

The homopolymerization of chloromethyl styrene (SMC) was carried out in bulk with 1 mole % CuCl, and 3 mole % 2,2'-bipyridyl. After 6 hours at 110° C. the conversion, determined by $^1$H-NMR, was 64%. The reaction mixture was precipitated into methanol/brine for purification. SEC was performed on the polymer sample and the molecular weight was found to be: $M_n$=1490, $M_w/M_n$=1.4. The molecular weight as determined by $^1$H-NMR was found to be $M_n$=1760, which corresponds to a degree of polymerization (DP) equal to 11.6.

EXAMPLE 7

Synthesis of star copolymer

This synthesis was demonstrated by dissolving the hydperbranched polystyrene (DP=11.6) prepared in Example 6, in butyl acrylate (BA), along with CuCl and dNbipy, then heating to 120° C. After three hours, the conversion of the BA was 98% with $M_n$=153,400; $M_w/M_n$=2.6. It should be noted that this molecular weight is a low estimate of the actual molecular weight of the polymer due to the star-like nature of the polymer. The hydrodynamic volume of star, or branched, polymers is smaller than that of linear polymers with a similar molecular weight. This difference results in the star polymer having longer retention times in a size exclusion chromatography (SEC) column, thereby giving an apparent, lower molecular weight.

By assuming that a butyl acrylate chain is grown from each function site on the hyperbranched styrene, one can estimate the size of the butyl acrylate chain by dividing $M_n$ (153,440) by the average number of functional groups (11.6). The obtained result was a minimum average of $M_n$=13,200 per arm.

EXAMPLE 8

Synthesis of 2-(2-bromopropionoxy) ethyl acrylate (2-BPEA)

2-BPEA; Under argon, a solution of 2-bromopropionyl bromide (36.45 ml, 348 mmol) in 50 ml of $CH_2Cl_2$, was added drop-wise to a stirring solution of 2-hydroxethyl acrylate (40.0 ml, 348 mmol) and pyridine (31.0 ml, 383 mmol) in 250 ml of $CH_2Cl_2$. The reaction was cooled in an ice bath. During the addition, a white precipitate formed (pyridine-HBr). After complete addition of the acid bromide (one hours), the reaction was stirred at room temperature for three hours. This precipitate was then filtered and the $CH_2Cl_2$ evaporated. Additional precipitate and a yellow oil were obtained. The precipitate was filtered and washed with $CH_2Cl_2$. The oil and $CH_2Cl_2$ wash were combined and washed with water (50 ml three times), then dried over $MgSO_4$ and treated with decolorizing carbon. The $CH_3Cl_2$ was evaporated to give a yellow oil. Distillation of the oil at 80° C./$10^{-7}$ mmHg gave a colorless oil. Yield 39.5 g (45%). 300 MHz $^1$H NMR (CDCl$_3$) δ: 6.43 (d, 1H); 6.14 (dd, 1H); 5.89 (d, 1H); 4,39 (m, 5 H); 1.82 (d, 3H).

EXAMPLE 9

Homopolymerization of 2-(2-bromopropionoxy) ethyl acrylate (2-BPEA):

To a 10 ml round bottom flask, copper (I) bromide (43.6 mg, 0.3 mmol), copper (II) bormide (6.7 mg, 0.03 mmol), 4,4'-di-t-butyl-2,2'-dipyridyl (272.4mg, 0.99 mmol) and a magnetic stirring bar were added. The flask was sealed with a rubber septum. The contents of the flask were then placed under vacuum and back-filled with argon (three times). Distilled and degassed 2-BPEA (5.0 ml, 30.9 mmol) was then added via a syringe. The flask was heated in an oil bath at 100° C., and stirred for 3.5 hours. Conversion was determined by $^1$H NMR (88.6%). The reaction mixture was dissolved in THF and precipitated into methanol/brine (three times). The polymer was obtained as a viscous solid and was dried under vacuum at room temperature for two days. The results are presented in Table 10 below:

EXAMPLE 10

Multi-arm Star Poly(butyl acrylate):

Homopolymer of 2-BPEA (DP=78) (1.0 g, 0.51 mmol (4 mmol Br)), copper-(I) bromide (29.1 mg, 0.2 mmol), 4,4'-di(1-butylpentyl)-2,2'-dipyridyl (163.2 mg, 0.4 mmol), and a magnetic stirring bar were added to a 50 ml round bottom flask. The flask was sealed with a rubber septum. The contents of the flask were placed under vacuum and back-filled with argon (three times). Distilled and degassed butyl acrylate (30.0 ml, 209.3 mmol) was added via a syringe. The contents of the flask were dissolved by stirring at room temperature. The flask was placed in an oil bath at 110° C., and stirred for 17 hours. Conversion was determined by $^1$H NMR (79%). The reaction mixture was dissolved in THF and precipitated into methanol/brine (three times). The polymer was obtained as a viscous fluid and was dried under vacuum at room temperature for two days. $M_n$=111,000 and $M_w/M_n$=2.6 for multi arm butyl acrylate star polymer.

EXAMPLE 11

Butyl Acrylate/2-BPEA Random Copolymer

To a 250 ml round bottom flask with a magnetic stirring bar, butyl acrylate (30.0 ml, 209 mmol), 2-BPEA (170 uL, 1.05 mmol), AIBN (34.3 mg, 0.209 mmol) and benzene 100.0 ml) were added. The flask was sealed with a rubber septum and the flask placed in a 60° C. oil bath. After 3 hours the reaction mixture became viscous; at which point it was quenched by precipitation into methanol/brine (three times). The resulting polymer was dried under vacuum at room temperature for one day. Yield 75%, $M_n$=215,000; $M_w/M_n$= 1.6.

EXAMPLE 12

Poly(Butyl Acrylate-g-Methyl Methacrylate):

5 g of poly(butyl acrylate-co-2-BPEA) was dissolved in 15.0 g of dimethoxybenzene (DMB) at 85° C. in a stoppered round bottom flask. Separately, in a 5 ml round bottom flask, copper(I) bromide (12.3 mg, 0.085 mmol), copper(II) bromide (1.8 mg, 0.008 mmol), and 4,4'-di(1-butylphentyl)-2, 2'-dipyridyl (75.5 mg, 0.19 mmol) were dissolved in methyl methacrylate (MMA) (3.0 ml, 28 mmol) under oxygen free conditions. 1.8 ml of this MMA solution was then added to a DMB solution at 85° C. The reaction was heated for 18 hours at 85° C. while stirring. The reaction mixture was dissolved in THF and precipitated into methanol (two times). The white, tacky solid was dried under vacuum at room temperature. The results are presented in Table 11 below.

TABLE 10

Results of the Homopolymerization of 2-BPEA by
Atom Transfer Radical Polymerization

| Sample | Time (h) | Conv. (%)[a] | $M_n$[b] | $M_w/M_n$[b] | $M_n$[c] | DP[c] | DB[d] | DB[e] |
|---|---|---|---|---|---|---|---|---|
| A | 3.5 | 89 | 4,600 | 2.8 | 18,570 | 78 | 44.5 | 42.3 |
| B | 23.0 | 95 | 8,300 | 2.0 | 25,380 | 101 | 47.5 | 43.8 |

[a]As determined by 300 MHz $^1$H NMR.
[b]As determined by GPC versus narrow, linear poly(MMA) standards.
[c]Degree of polymerization; as determined by 620 MHz $^1$H NMR.
[d]Degree of branching as predicted by $\alpha$ = conversion/2.
[e]Degree of branching: as determined by 620 MHz $^1$H NMR.

TABLE 11

Graft Copolymers of Butyl Acrylate

| Monomer | $M_n$ | $M_w/M_n$ | Amt of Graft Copolymer (mol %) |
|---|---|---|---|
| Styrene | 473,000 | 1.6 | 31% |
| MMA | 337,000 | 2.2 | 11% |

EXAMPLE 13
Hyperbranched Acrylic Polymers with Narrow Polydispersity

Under oxygen free conditions (argon), methyl-α-chloroacrylate (1.0 g, 6.6 mmol) was added to a tube containing benzyl chloride (5.75 mL, 0.05 mmol), Cu(I)Cl (4.95 mg, 0.05 mmol), and 4,4'-di-(1-butylpentyl)-2,2'-dipyridyl (40.8 mg, 0.10 mmol). The reaction tube was sealed and then heated to 110° C. After 3 hours the green reaction mixture was viscous and was dissolved in THF. This solution was then precipitated into MeOH/brine (3 times).

TABLE 9

| Sample | [M]/[I] | Time (h) | Conversion | M | $M_w/M_n$ |
|---|---|---|---|---|---|
| S-12-25 | 132 | 3.0 | 58 | 2190 | 1.15 |
| S-12-39A | 20 | 1.5 | 93 | 2260 | 1.24 |
| S-12-41 | 66 | 4.5 | 90 | 1850 | 1.13 |
| S-12-43 | 271 | 9.0 | 95 | 1950 | 1.15 |

EXAMPLE 14
Polymerization of styrene initiated by difuncitonal polysiloxane macroinitiator Polymerization of styrene initiated by the difunctional polysiloxane macroinitiator was carried out with CuCl/dNbipy catalyst in phenyl ether at 130° C. The macroinitiator dissolved well in the solvent and the produced polymer did not precipitate, although the catalyst system was not homogeneous. The polymerization was stopped after 480 min, because the reaction mixture became very viscous. The final conversion of styrene monomer was 70%.

Figure 12:
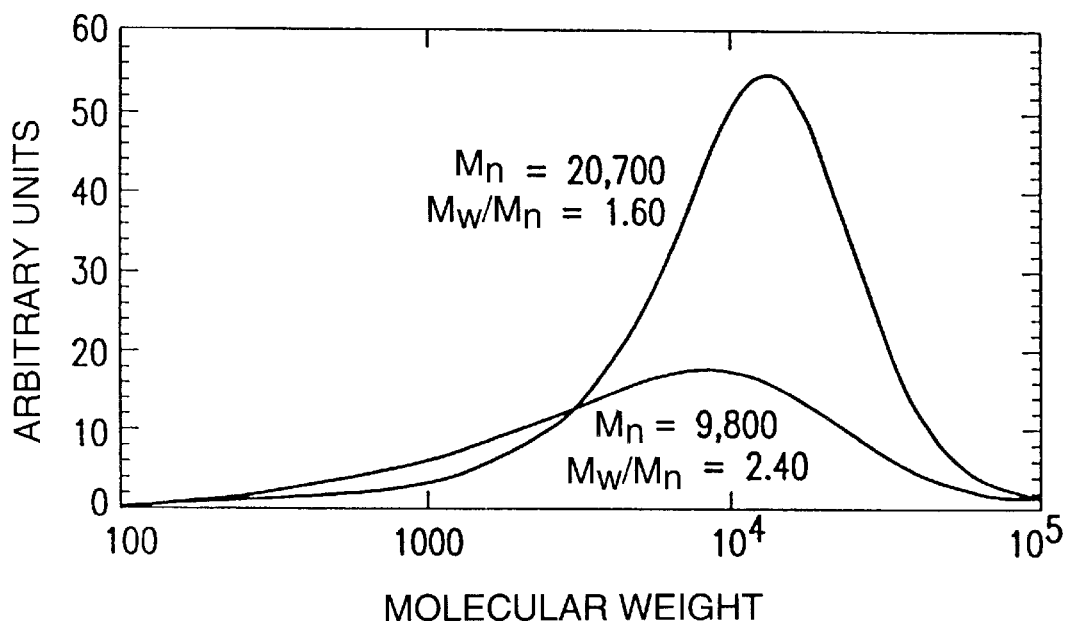
FIG. 12 shows GPC traces of a difunctional polysiloxane macromonomer and the resulting copolymer with styrene.

GPC traces of the difuncitonal polysiloxane macroinitiator and the sample at 480 min are shown in FIG. 12. The peak of produced polymer was always monomodal during the reaction, and shifted to higher molecular weight. The macroinitiator has $M_n$=9800, $M_w/M_n$=2.40, and the polymer produced after 80 min has, after reprecipitation in MeOH, $M_n$=28300, and $M_w/M_n$=1.52.

Figure 13:
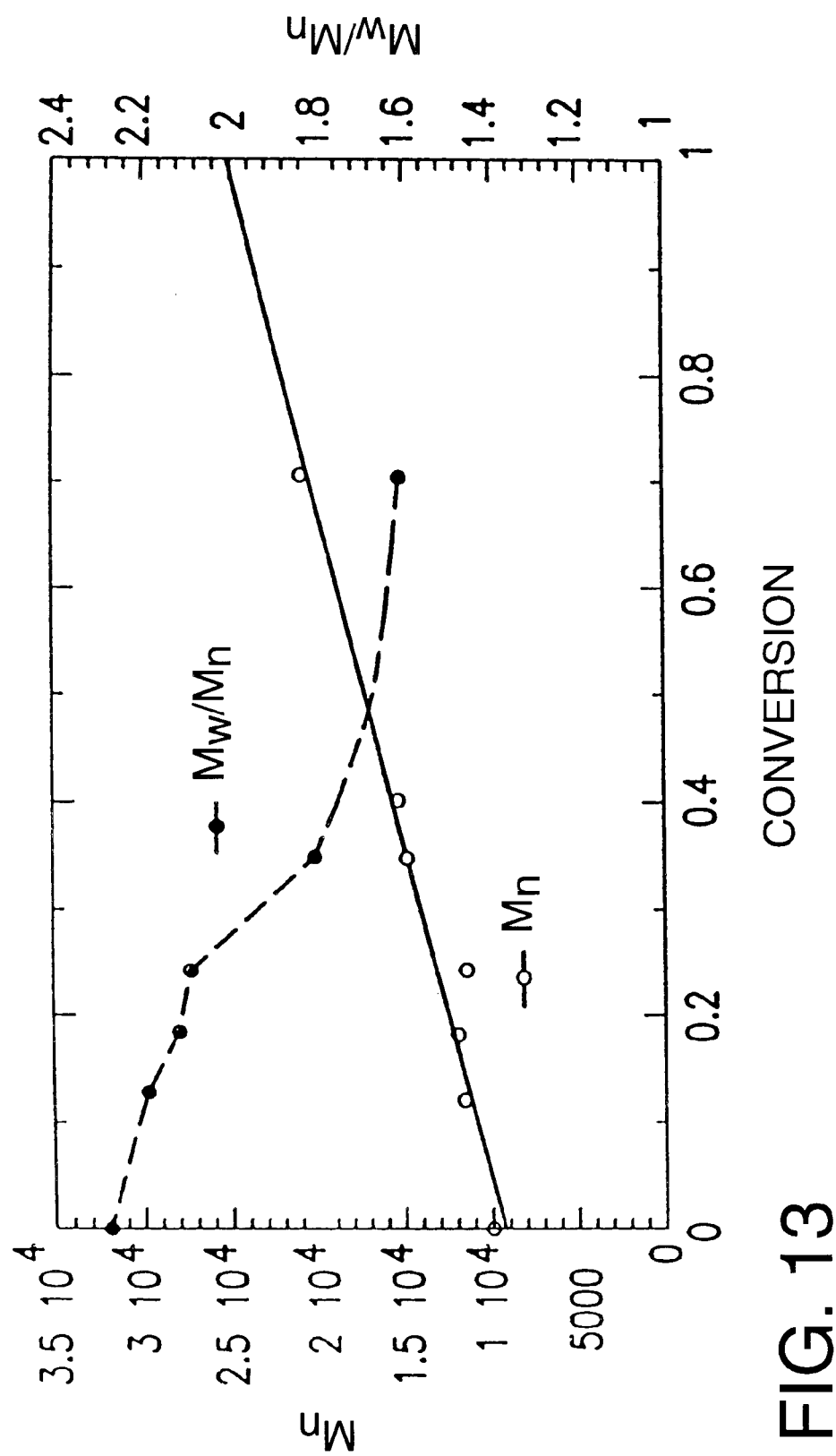
FIG. 13 shows the $M_n$ and polydispersity dependence on conversion for ATRP of styrene with difunctional polysiloxane macromonomer.

The plot of $M_n$ and polydispersity dependence on conversion in this polymerization is shown in FIG. 13. A linear increase of number average molecular weight, $M_n$, versus monomer conversions was observed. The polydispersity decreased with the progress of polymerization. It shows the reaction was well controlled and the polystyrene blocks have low polydispersity.

Figure 14:
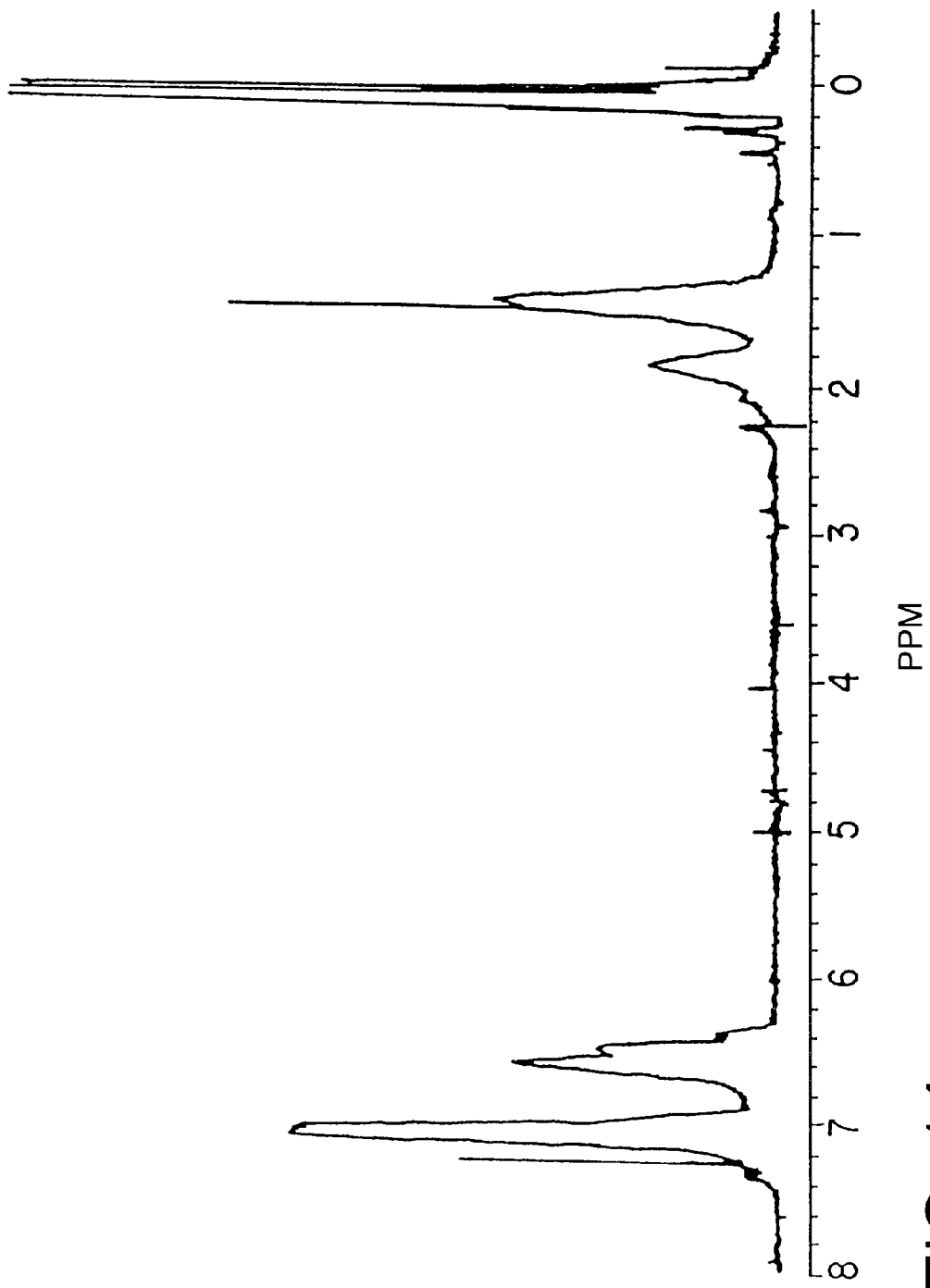
FIG. 14 shows the $^1$H-NMR spectrum of polystyrene-b-polydimethylsiloxane-b-polystyrene block copolymer prepared by ATRP.
Figure 15:
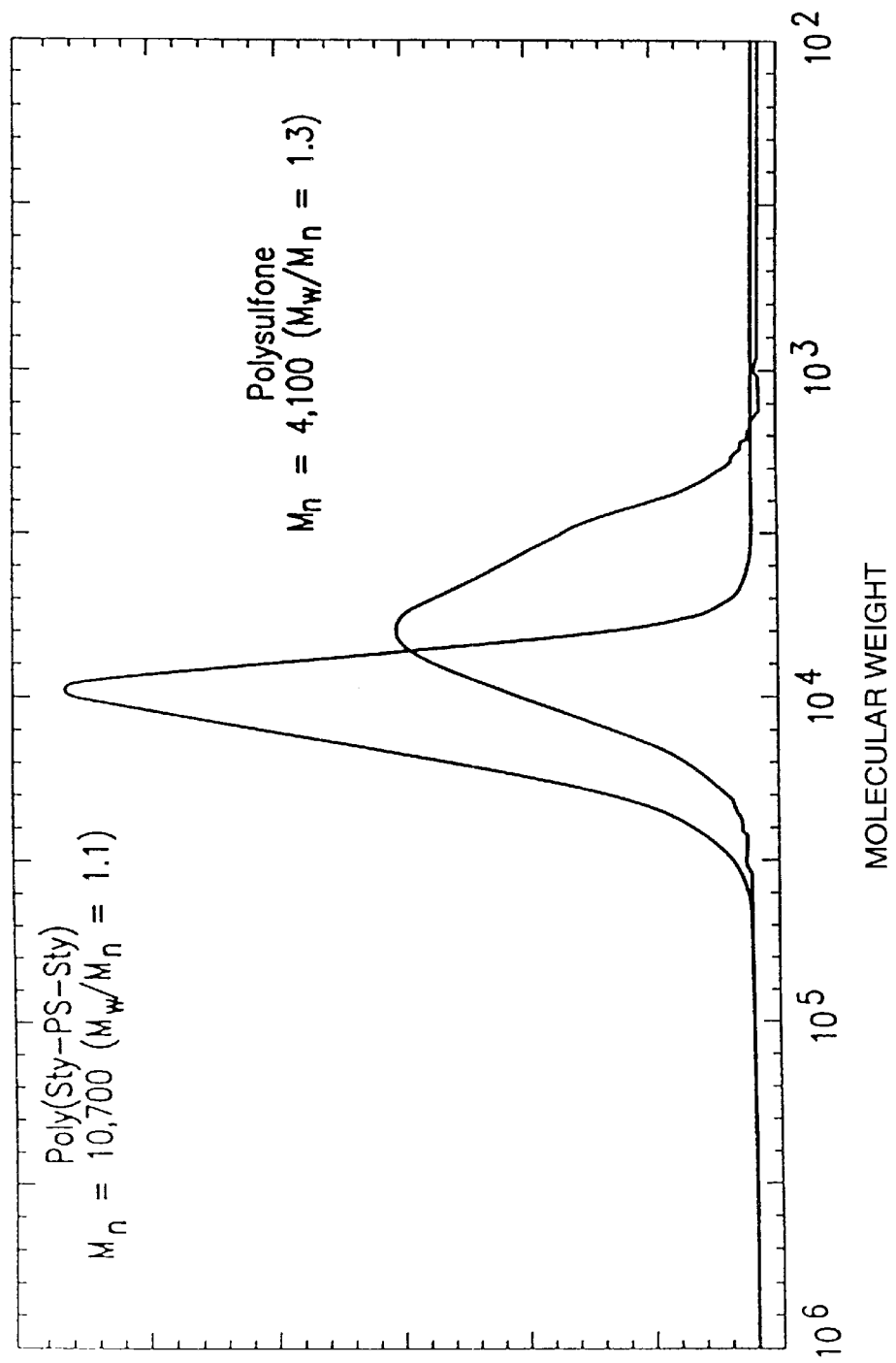
FIG. 15 shows GPC traces of polysulfone and poly(styrene-b-sulfone-b-styrene).
Figure 16:
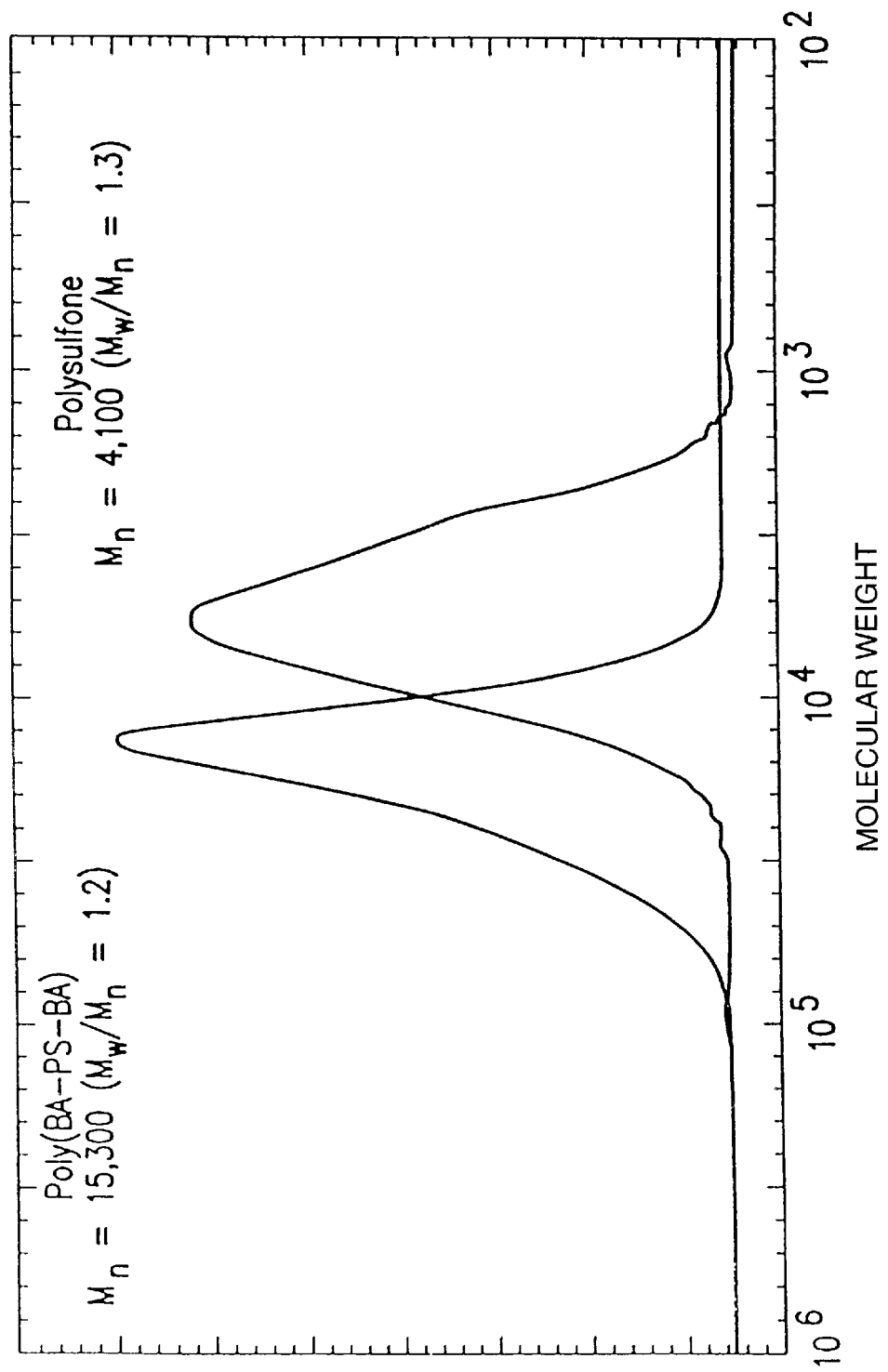
FIG. 16 shows GPC traces of polysulfone and poly(butyl acrylate-b-sulfone-b-butyl acrylate).
Figure 17:
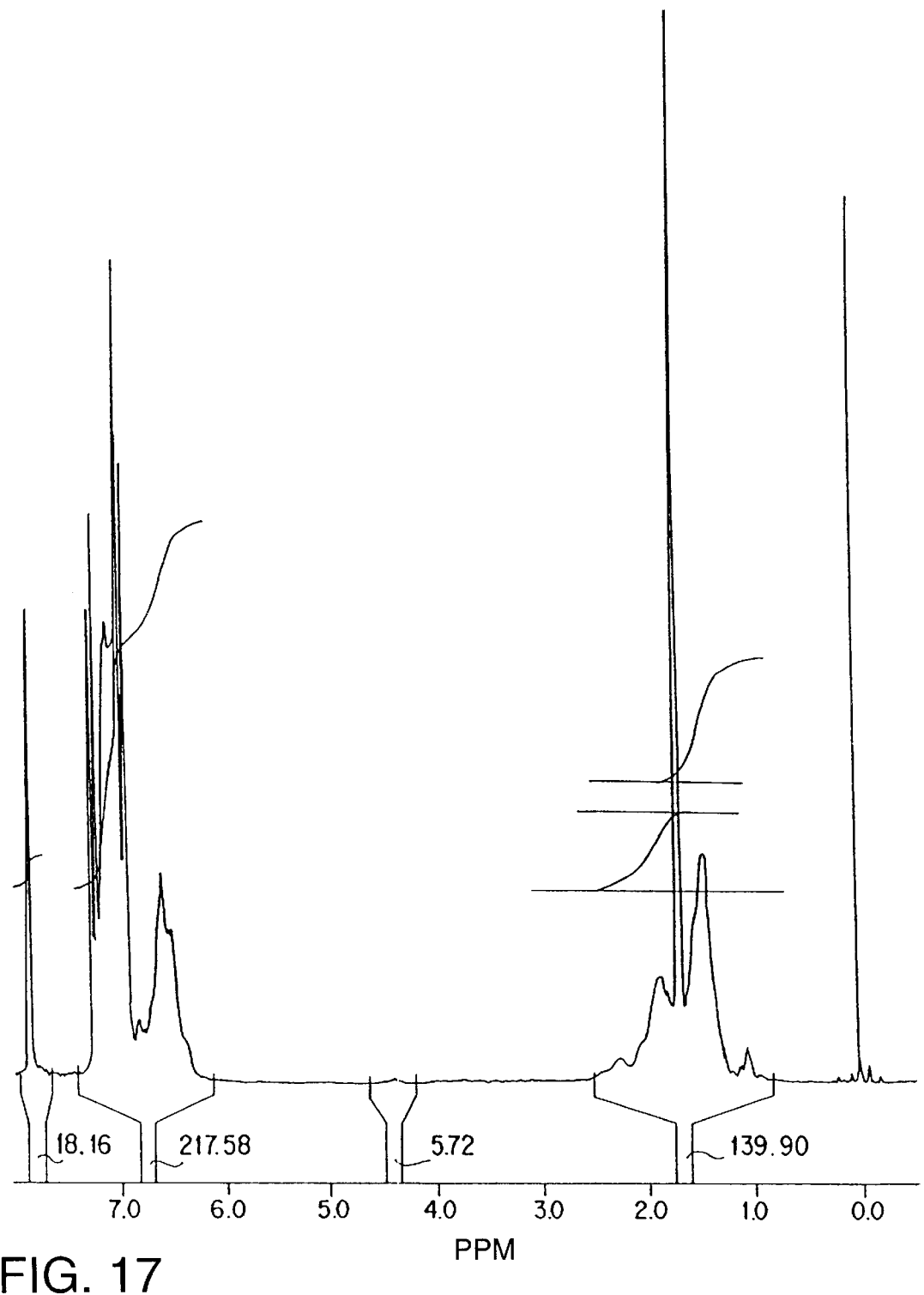
FIG. 17 shows a $^1$H-NMR spectrum of poly(styrene-b-sulfone-b-styrene).
Figure 18:
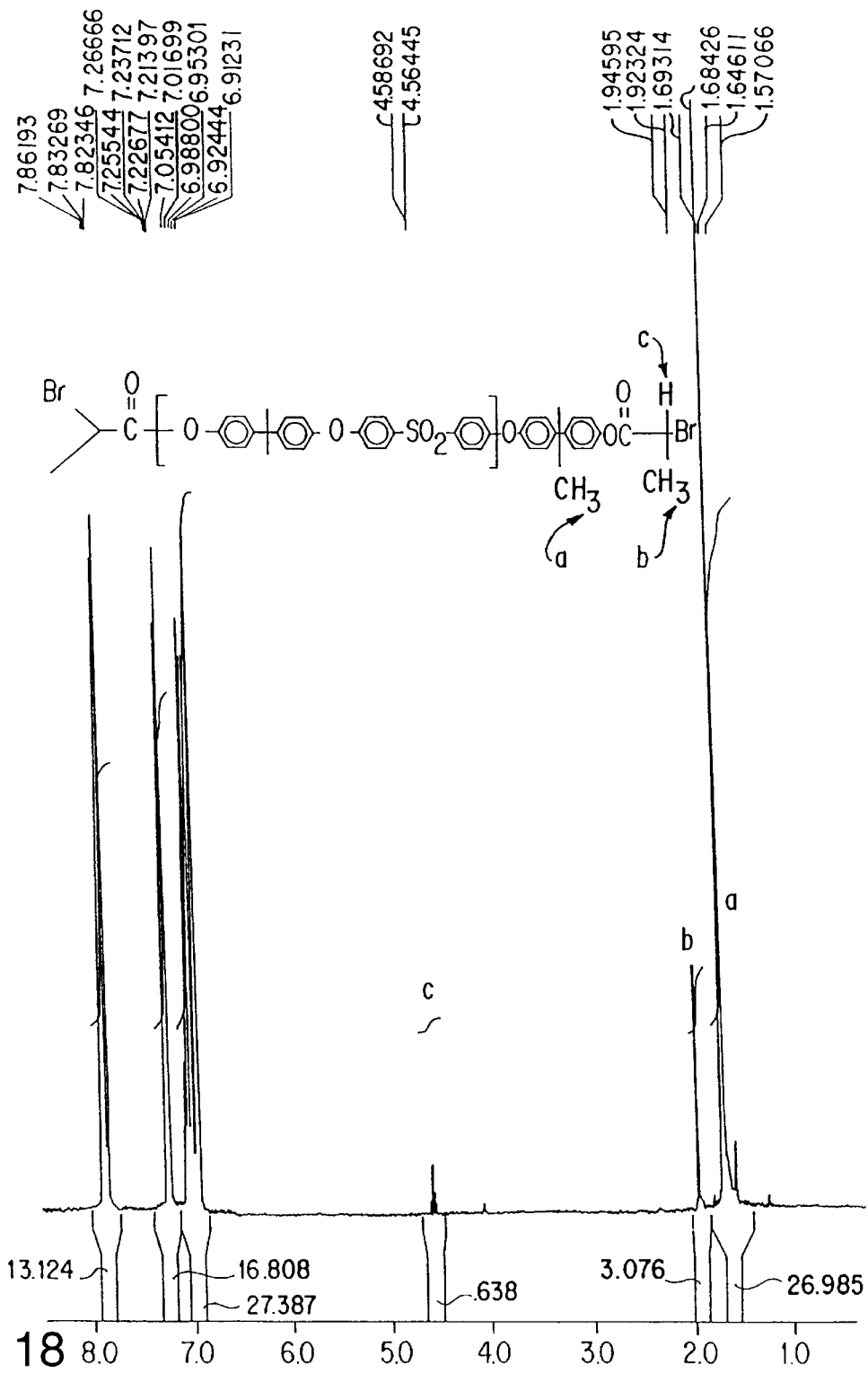
FIG. 18 shows a $^1$N-NMR spectrum of polysulfone.
Figure 19:
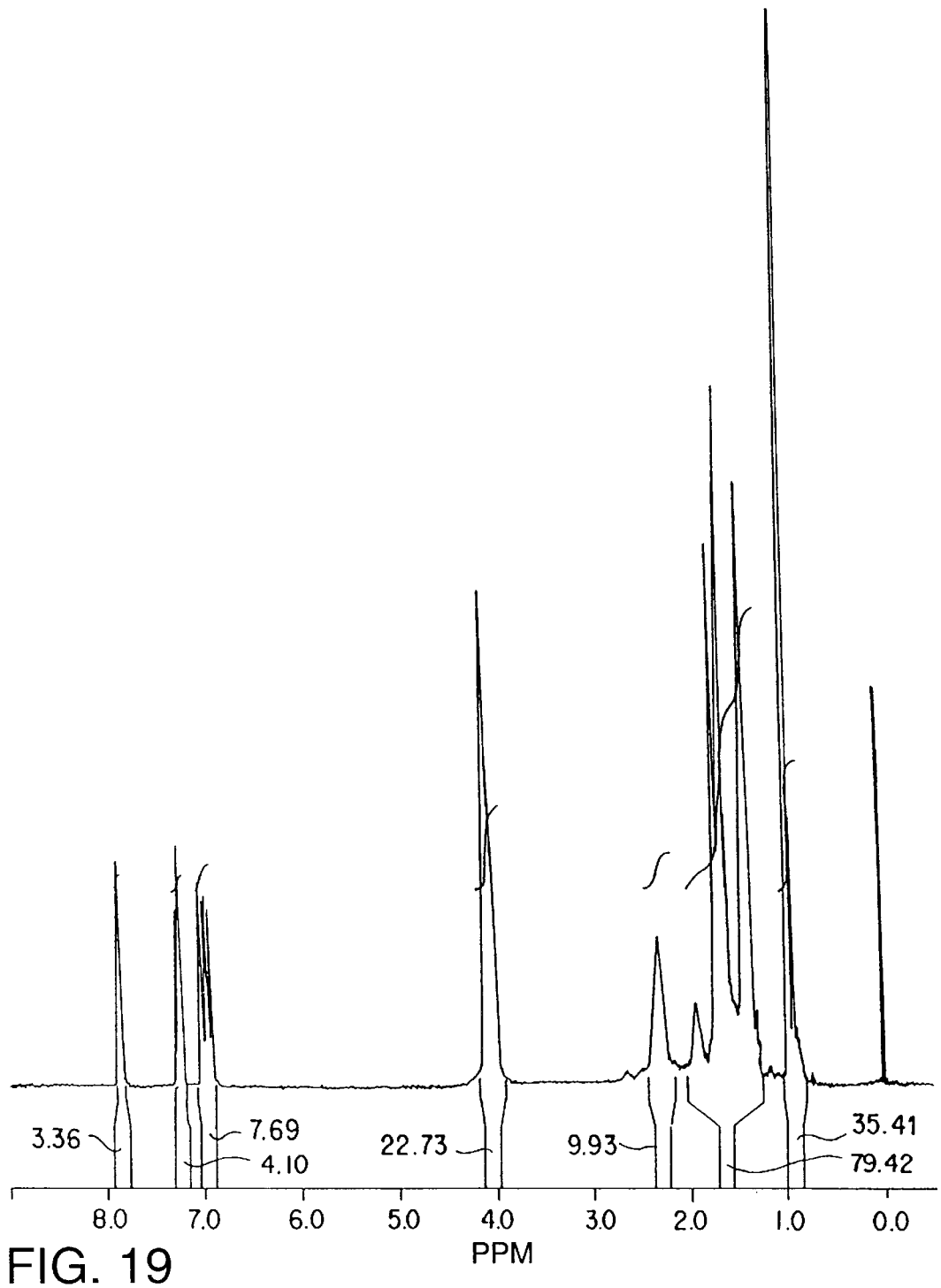
FIG. 19 shows a $^1$H-NMR spectrum of poly(butyl acrylate-b-sulfone-b-butyl acrylate).

$^1$H-NMR spectrum of the final product of poly(styrene-b-dimethylsiloxane-b-styrene) copolymer is shown in FIG. 14. It reveals that the polymer consists of polystyrene and polydimethylsiloxane. The molar ratio of styrene to dimethylsiloxane unit was 0.84.

EXAMPLE 15
Polymerization of butyl acrylate initiated by difunctional polysiloxane macroinitiator Similarly to the poly(styrene-b-dimethylsiloxane-b-styrene) triblock copolymers, the poly(butyl acrylate-b-dimethylsiloxane-b-butyl acrylate) triblock copolymer was prepared. The polymerization of butyl acrylate initiated by the difuncitonal polydimethylsiloxane macroinitiator was carried out with CuCl/dNbipy in 1,4-dimethoxybenzene at 100° C. The polymerization was stopped at 1020 min because of high viscosity. The produced polymer after 1020 min has $M_n$=24000, and $M_w/M_n$=1.58. The final product after reprecipitation from MeOH, was viscous solid with $M_n$=36500, $M_w/M_n$=1.32.

EXAMPLE 16
Hydrosilation of 2-(4'-chloromethyl-benzyl) ethyldimethylsilane to vinyldimethylsilyl terminated high-molecular-weight polydimethylsiloxane A mixture of vinyldimethylsilyl terminated polydimethylsiloxane (Mn=30,000–40,000; 10.00 g), 2-(4'-chloromethylbenzyl)ethyldimethylsilane (0.20 g), Pt[{(CH$_2$=CH)Me$_2$Si}$_2$O]$_2$ complex xylene solution (2.0×10$^{-6}$ mmol) and benzene (5.0 ml) was stirred at 70° C. for 3 hours. Disappearance of the vinyl group of the polysiloxane was confirmed by $^1$H-NMR. The reaction mixture was reprecipitated in MeOH to remove excess initiator.

EXAMPLE 17
Polymerization of styrene initiated by high-molecular-weight polysiloxane macroinitiator The polymerization was carried out in a previously dried flask equipped with a magnetic stirring bar under Ar. The prepared high-molecular-weight polysiloxane macroinitiator (2.0 g), CuCl (0.043 g), dNbipy (0.36 g) and anisole (1.33 ml) were put into the flask, and then the flask was degassed three items. Styrene (2.0 ml) was transferred to the flask by means of rubber septum and syringe/capillary technique. The mixture was stirred at 130° C. under Ar. The conversion of the polymerization was determined by gas chromatography (GC) measurement of samples reaction mixture. After 6 hours the heating was stopped, when the conversion of styrene was 47%. The reaction mixture was purified by means of short $Al_2O_3$ column and reprecipitation into MeOH from THF. The final polymer was analyzed by $^1$H-NMR to show that the poly(dimethylsiloxane) core block has $M_n$=40,000 and the polystyrene side block has $M_n$=9,200. THF solution of the polymer was casted on a glass and the solvent was evaporated slowly to give an elastomeric material.

EXAMPLE 18
Synthesis of Polysulfone

Polysulfone was synthesized in the following manner: To a 3-neck 300 ml round bottom flask with a Dean-Stark condenser, thermometer, and magnetic stir bar, bisphenol A (5.36 g, 23.5 mmol), 4,4'-difluorosulfone (5.00 g, 19.9 mmol), potassium carbonate (8.13 g, 58.8 mmol), N,N'-dimethylacetamide (60 ml) and toluene (40 ml) were added. The Dean-Stark apparatus was filled with 20 ml of toluene. The reaction was heated to 140° C. for 4 h to dehydrate the reaction. The temperature was then increased to 170° C. overnight. The reaction mixture was cooled to rt and precipitated into MeOH/water (50:50). The resulting polymer was dissolved in THF and reprecipitated into MeOH/brine (2 times). Mass 7.53 g; Yield: 79%; $M_n$=4,300, $M_w/M_n$=1.3.

EXAMPLE 19
Synthesis of bromopropionyl end capped polysulfone 5.0 g of polysulfone was dissolved in 50 ml of dry THF. To this stirring solution, pyridine (0.5 ml, 5.88 mmol) and 2-bromopropionyl bormide (0.62 ml, 5.88 mmol) were added. A precipitate formed. After stirring at rt for 1 h, the solution was precipitated into a methanol/water (50:50) mixture. The polymer was reprecipitated three times with THF into MeOH/brine. Mn=4,600; $M_w/M_n$=1.3.

EXAMPLE 20
Synthesis of Poly(styrene-b-sulfone-styrene)

1.0 g of the bromopropionyl end capped polysulfone (0.25 mmol, 0.5 mmol of Br), copper (1) bromide (36.1 mg, 0.25 mmol), dNbipy (202.4 mg, 0.5 mmol), and 1.0 of dimethoxybenzene were charged to a 10 ml round bottom flask with a magnetic stir bar. The flask was sealed with a rubber septum and then degassed with argon (vacuum/backfill). Degassed and deinhibited styrene (2.6 g, 25 mmol) was then added to the reaction flask. The reaction was heated to 110° C. for 6 hours. Conversion as determined by $^1$H NMR was 67%. The polymer was purified by precipitation from THF into methanol. Mass: 2.35 g, 66% yield, $M_n$ by GPC was 9,100, $M_w/M_n$=1.1 . $M_n$ by $^1$H nMR was 10,700, with 62% styrene by weight.

EXAMPLE 21
Synthesis of poly(butyl acrylate-b-sulfone-butylacrylate)

1.0 g of the bromopropionyl end capped polysulfone (0.25 mmol, 0.5 mmol of Br), copper (1) bromide (36.1 mg, 0.25 mmol), dNbipy (202.4 mg, 0.5 mmol), and 1.0 g of dimethoxybenzene were charged to a 10 ml round bottom flask with a magnetic stir bar. The flask was sealed with a rubber septum and then degassed with argon (vacuum/backfill). Degassed and deinhibited butyl acrylate (3.2 g, 25 mmol) was then added to the reaction flask. The reaction was heated to 110° C. for 6 hours. Conversion as determined by $^1$H NMR was 95%. The polymer was purified by precipitation form THF into methanol. Mass: 2.85 g, 68% yield, $M_n$ by GPC was 13,800, $M_w/M_n$=1.2, $M_n$ by $^1$H NMR was 15,300, with 74% styrene by weight.

EXAMPLE 22
Synthesis of Polyester from Adipic Acid and 1,6-Hexanediol

To a three neck round bottom flask with a Dean-Stark trap, nitrogen inlet and a magnetic stir bar, 1,6-hexanediol (5.0 g, 42.3 mmol), adipic acid (4.81 g, 32.9 mmol), 2-bromopropionic acid (1.44 g, 9.4 mmol) and toluene (100 ml) were added. The reaction was heated to reflux overnight. A sample was taken for GPC analysis, $M_n$=2,100, $M_w/M_n$=1.5.

To a flask, under an argon atmosphere, containing copper (I) bromide, (1.36.7 mg, 0.94 mmol) and dNbipy (767.0 mg, 1.88 mmol), 53.8 ml of deinhibited and degassed styrene was added. This mixture was stirred until all solids were dissolved and a dark red solution has formed. This solution was transferred to the polyester/toluene solution by cannula under argon. The reaction was stirred at 110° C. for 16 hours. The reaction mixture was then cooled and precipitated into methanol/brine (3 items). Mass: 64.0 g, Yield 86%. GPC: $M_n$=5,950, $M_w/M_n$=1.3. $^1$H NMR showed 81% styrene by weight.

EXAMPLE 23
Preparation of Macromonomer from Hydrosilyl Terminated Poly(dimethylsiloxane)

To a mixture of difunctinal hydrosilyl terminated poly (dimethylsiloxane) (20.00 g;), vinylbenzyl chlroride (3.29 ml, $2.31 \times 10^{-2}$ mol; m,p-mixture) and benzene was added $Pt((CH_2=CH)Me_2Si)_2O_2)$ xylene solution (0.32 ml, $3.08 \times 10^{-5}$ mol) at room temperature under air. The mixture was stirred at 50° C. for 1 h. A part of the reaction mixture was analyzed by $^1$H-NMR showing no remaining hydrosilyl group. The product was isolated by reprecipitation in MeOH. The product had $M_n$=4400 and $M_w/M_n$=1.25.

EXAMPLE 24
Polymerization of Styrene with the Macroinitiator

A mixture of the poly(dimethylsiloxane) macroinitiator (2.00 g), styrene (6.00 ml, $5.24 \times 10^{-2}$ mol), CuCl (0.068 g, $6.90 \times 10^{-4}$ mol) and dNbipy (0.56 g, $1.38 \times 10^{-3}$ mol) was stirred at 130° C. under Ar. The mixture was cooled down after 90 min, and diluted with THF. The solution was passed through a short $Al_2O_3$ column and poured into MeOH to give white precipitate. The precipitate was combined and dried in vacuo. The product had $M_n$=11000, $M_w/M_n$=1.15. The GPC traces were always monomodal during the polymerizaiton.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the preparation of one of an $AN_2$ monomer, a small molecule initiator or a macroinitiator for a controlled polymerization process for free radically (co) polymerizable monomers, comprising the step of: reacting a first molecule comprising at least one of a first functional group with a second molecule comprising at least one of a second functional group and at least one of a third functional group wherein said third functional group is a radically transferable atom or group.

2. The process of claim 1, wherein one of said $AB_2$ monomer, said small molecule initiator or said macroinitiator comprises at least one of a functional group wherein said functional group can be activated to lead to the formation of a radical in a redox reaction with a transition metal complex.

3. The process of claim 2, wherein said functional group is selected from the group consisting of α-haloester, thioester, benzyl halide, cyanopropylhalide, a group comprising multiple halogen atoms, Cl, Br, I, $OR^{10}$, $SR^{14}$, $SeR^{14}$, —SCN, $OC(=O)R^{14}$, $OP(=O)R^{14}$, $OP(=O)(OR^{14})_2$, $OP(=O)OR^{14}$, $O-N(R^{14})_2$, and $S-C(=S)N(R^{14})_2$, wherein $R^{10}$ is selected from the group consisting of substituted or unsubstituted alkyl of from 1 to 20 carbon atoms, substituted or unsubstituted alkenyl of from 2–20 carbon atoms, substituted or unsubstituted alkynyl of from 2 to 10 carbon atoms, substituted or unsubstituted phenyl or substituted or unsubstituted aralkyl; and $R^{14}$ is selected from the group consisting of aryl, a straight or branched $C_1$–$C_{20}$ alkyl group, and when an $N(R^{14})_2$ group is present, the two $R^{14}$ groups may be joined to form a 5-, 6- or 7-membered heterocyclic ring.

4. The process of claim 3, wherein at least on of a hydrogen group of said alkyl group of form 1 to 20 carbon atoms is substituted with a halide.

5. The process of claim 4, wherein said halide is selected from the group consisting of fluoride and chloride.

6. The process of claim 3, wherein said alkenyl is a vinyl.

7. The process of claim 3, wherein said alkylnyl is an acetylenyl.

8. The process of claim 3, wherein said pehnyl is substituted with from 1 to 5 halogen atoms.

9. The process of claim 3, wherein said phenyl is substituted with alkyl groups from 1 to 4 carbon atoms.

10. The process of claim 3, wherein said aryl group is selected from the group consisting of phenyl or substituted phenyl and an alkyl group is from 1 to 6 carbon atoms.

11. The process of claim 3, wherein said straight or unbranched alkyl group contains 1 to 10 carbon atoms.

12. The process of claim 1, wherein said first molecule contains more than one functional group and said second molecule is optionally added at less than a molar equivalent of said more than one functional group on said first molecule.

13. The process of claim 1, wherein said at least one functional group on said first molecule is reactive with the functional group on said second molecule and is selected from the group consisting of a vinyl group, a hydrosilyl group, a hydroxy group, and an amine group.

14. The process of claim 1, wherein said at least one of a second functional group is selected from the group consisting of hydroxyl, carboxyl, amine, —SiH and —C(=O)—X, wherein X is a halogen.

15. The process of claim 1, wherein said second molecule is selected from the group consisting of an aryl halide and an acyl halide.

16. The process of claim 15, wherein said second molecule is selected from the group consisting of chloroacetyl chlroride, 2-halopropionyl halide and 2-haloisobutyryl halide.

17. The process of claim 1, wherein said second molecule is an acid halide.

18. The process of claim 17, wherein said acid halide is an acid chloride.

19. A process for the preparation of graft copolymers, comprising:

(a) compolymerizing a free radically (co)polymerizable monomer with an $AB_2$ monomer to thereby form a macroinitiator of the formula:

$$(macromolecule)\text{-}(X)_n$$

wherein each X is a halogen atom and n is an integer of 1 to 100, and wherein X is dispersed along a backbone of the polymer and wherein the number average molecular weight of said macroinitiator is between 500 and 100,000;

(b) homopolymerizing or copolymerizing at least one of a vinyl monomer in the presence of an initiating system, comprising:
  (i) said macroinitiator,
  (ii) a transition metal compound,
  (iii) a ligand, able to coordinate with said transition metal compound;

to thereby initiate polymerization of said vinyl monomer to form a graft copolymer.

20. The process of claim 19, wherein said radically copolymerizable monomer is added prior to initiating said polymerization.

21. The graft copolymer of claim 19 having a backbone portion and a graft portion, wherein the glass transition temperatures of the backbone portion of said graft copolymer and the graft portion of said graft copolymer are different.

22. The graft copolymer of claim 19, wherein a backbone polymer phobicity and a graft copolymer phobicity are different.

23. A process for making a block or graft copolymer, comprising the steps of:

(a) polymerizing a vinyl monomer in the presence of an initiating system, comprising:
  (i) an initiator having one or more radically transferable atoms or groups,
  (ii) a transition metal compound, and
  (iii) a ligand, able to coordinate with said transition metal compound;

to thereby form a macroinitiator of the formula:

$$(macromolecule)\text{-}(X)_n$$

wherein each X is a radically transferable atom or group and n is an integer of 1 to 100, and wherein the number average molecular weight of said macroinitiator is between 500 and 100,000;

(b) homopolymerizing or copolymerizing at least one of a vinyl monomer in the presence of an initiating system, comprising:
  (iv) said macroinitiator,
  (v) a transition metal compound, and
  (vi) a ligand, able to coordinate with said transition metal compound, to thereby initiate polymerization of said vinyl monomer to form a block or graft copolymer.

24. The process of claim 23, wherein said macroinitiator comprises units derived from a second vinyl monomer selected from the group consisting of methyl acrylate, ethyl acrylate, n-butyl acrylate, 2-ethylhexyl acrylate, methyl methacrylate, ethyl methacrylate, isobutyl methacrylate, 2-hydroxyethyl methacrylate and isobornyl methacrylate; and wherein said vinyl monomer is a vinyl monomer containing at least one polar group and is selected from the group consisting of acrylonitrile and methacrylonitrile.

* * * * *

UNITED STATES PATENT AND TRADEMARK OFFICE
CERTIFICATE OF CORRECTION

| | | |
|---|---|---|
| PATENT NO. | : 6,162,882 | |
| APPLICATION NO. | : 09/431871 | |
| DATED | : December 19, 2000 | |
| INVENTOR(S) | : Matyjaszewski et al. | |

It is certified that error appears in the above-identified patent and that said Letters Patent is hereby corrected as shown below:

Column 27, TABLE 5, Monomer column, Exp 3 row, delete "$CH_2=CH(COMe)$," and substitute therefor --$CH_2=CH(CO_2Me)$--.

Column 27, TABLE 5, Monomer column, Exp 4 row, delete "$CH_2=CCH_3(COMe)$," and substitute therefor --$CH_2=CCH_3(CO_2Me)$--.

Signed and Sealed this

Nineteenth Day of August, 2008

JON W. DUDAS
*Director of the United States Patent and Trademark Office*